(12) United States Patent
Pearson et al.

(10) Patent No.: US 7,430,295 B1
(45) Date of Patent: Sep. 30, 2008

(54) SIMPLE UNTRUSTED NETWORK FOR QUANTUM CRYPTOGRAPHY

(75) Inventors: David Spencer Pearson, Bennington, VT (US); Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 854 days.

(21) Appl. No.: 10/795,398

(22) Filed: Mar. 9, 2004

Related U.S. Application Data

(60) Provisional application No. 60/456,822, filed on Mar. 21, 2003, provisional application No. 60/456,852, filed on Mar. 21, 2003, provisional application No. 60/456,624, filed on Mar. 21, 2003.

(51) Int. Cl.
*H04L 9/00* (2006.01)
(52) U.S. Cl. ........................ 380/256; 380/278
(58) Field of Classification Search ................. 380/256, 380/277, 278
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,243,649 A | 9/1993 | Franson | 380/9 |
| 5,307,410 A | 4/1994 | Bennett | |
| 5,311,572 A | 5/1994 | Friedes et al. | |
| 5,325,397 A | 6/1994 | Scholz et al. | |
| 5,339,182 A | 8/1994 | Kimble et al. | 359/112 |
| 5,400,325 A | 3/1995 | Chatwani et al. | |
| 5,414,771 A | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | 380/21 |
| 5,710,773 A | 1/1998 | Shiga | |
| 5,729,608 A | 3/1998 | Janson et al. | |
| 5,732,139 A | 3/1998 | Lo et al. | 380/28 |

(Continued)

FOREIGN PATENT DOCUMENTS

WO    WO 02/05480    1/2002

OTHER PUBLICATIONS

"Quantum key distribution: Real-time compensation of interferometer phase drift," NTNU Department of Physical Electronics, pp. 1-45.

(Continued)

*Primary Examiner*—Gilberto Barron, Jr.
*Assistant Examiner*—Martin Jeriko P San Juan
(74) *Attorney, Agent, or Firm*—Ropes & Gray LLP

(57) ABSTRACT

A method and system for distributing quantum cryptographic keys among a group of user devices through a switch connected to the user devices are provided. A switch [1000] establishes a connection between two user devices [405a, 405b] according to a schedule. A Quantum Key Distribution (QKD) session is established between the two user devices [405a, 405b] to facilitate sharing of secret key material between the two user devices. Connections and QKD sessions may be established for different pairs of the user devices.

54 Claims, 18 Drawing Sheets

U.S. PATENT DOCUMENTS

| | | | |
|---|---|---|---|
| 5,757,912 A | 5/1998 | Blow | 380/21 |
| 5,764,765 A | 6/1998 | Phoenix et al. | 380/21 |
| 5,764,767 A | 6/1998 | Beimel et al. | |
| 5,768,378 A * | 6/1998 | Townsend et al. | 380/256 |
| 5,768,391 A | 6/1998 | Ichikawa | |
| 5,805,801 A | 9/1998 | Holloway et al. | |
| 5,850,441 A | 12/1998 | Townsend et al. | 380/21 |
| 5,911,018 A | 6/1999 | Bischel et al. | |
| 5,953,421 A | 9/1999 | Townsend | 380/21 |
| 5,960,131 A | 9/1999 | Fouquet et al. | |
| 5,960,133 A | 9/1999 | Tomlinson | |
| 5,966,224 A | 10/1999 | Hughes et al. | 359/112 |
| 6,005,993 A | 12/1999 | MacDonald | |
| 6,028,935 A | 2/2000 | Rarity et al. | 380/21 |
| 6,052,465 A | 4/2000 | Gotoh et al. | |
| 6,097,696 A | 8/2000 | Doverspike | |
| 6,122,252 A | 9/2000 | Aimoto et al. | |
| 6,130,780 A | 10/2000 | Joannopoulos et al. | |
| 6,145,024 A | 11/2000 | Maezawa et al. | |
| 6,154,586 A | 11/2000 | MacDonald et al. | |
| 6,160,651 A | 12/2000 | Chang et al. | |
| 6,188,768 B1 * | 2/2001 | Bethune et al. | 380/278 |
| 6,233,075 B1 | 5/2001 | Chang et al. | |
| 6,233,393 B1 | 5/2001 | Yanagihara et al. | |
| 6,272,548 B1 | 8/2001 | Cotter et al. | |
| 6,289,104 B1 | 9/2001 | Patterson et al. | |
| 6,341,127 B1 | 1/2002 | Katsube et al. | |
| 6,378,072 B1 | 4/2002 | Collins et al. | |
| 6,430,345 B1 * | 8/2002 | Dultz et al. | 385/122 |
| 6,463,060 B1 | 10/2002 | Sato et al. | |
| 6,507,012 B1 | 1/2003 | Medard et al. | |
| 6,519,062 B1 | 2/2003 | Yoo | |
| 6,522,749 B2 | 2/2003 | Wang | |
| 6,529,498 B1 | 3/2003 | Cheng | |
| 6,532,543 B1 | 3/2003 | Smith et al. | |
| 6,538,990 B1 | 3/2003 | Prorock | |
| 6,539,410 B1 | 3/2003 | Klass | |
| 6,560,707 B2 | 5/2003 | Curtis et al. | |
| 6,563,796 B1 | 5/2003 | Saito | |
| 6,594,055 B2 | 7/2003 | Snawerdt | |
| 6,605,822 B1 | 8/2003 | Blais et al. | |
| 6,646,727 B2 | 11/2003 | Saleh et al. | |
| 6,647,010 B1 | 11/2003 | Ford et al. | |
| 6,650,805 B2 * | 11/2003 | Chen et al. | 385/18 |
| 6,654,346 B1 | 11/2003 | Mahalingaiah et al. | |
| 6,661,806 B1 | 12/2003 | Eriksson et al. | |
| 6,678,379 B1 | 1/2004 | Mayers et al. | |
| 6,684,335 B1 | 1/2004 | Epstein et al. | |
| 6,728,281 B1 | 4/2004 | Santori et al. | |
| 6,748,434 B2 | 6/2004 | Kavanagh | |
| 6,754,214 B1 | 6/2004 | Mahalingaiah | |
| 6,778,557 B1 | 8/2004 | Yuki et al. | |
| 6,799,270 B1 | 9/2004 | Bull et al. | |
| 6,801,626 B1 | 10/2004 | Nambu | |
| 6,836,463 B2 | 12/2004 | Garcia-Luna Aceves et al. | |
| 6,862,564 B1 | 3/2005 | Shue et al. | |
| 6,882,431 B2 | 4/2005 | Teich et al. | |
| 6,895,091 B1 | 5/2005 | Elliott et al. | |
| 6,895,092 B2 | 5/2005 | Tomita | |
| 6,897,434 B1 | 5/2005 | Kumar et al. | |
| 6,986,056 B1 | 1/2006 | Dultz et al. | |
| 7,028,059 B2 | 4/2006 | Williams et al. | |
| 7,035,411 B2 | 4/2006 | Azuma et al. | |
| 2001/0038695 A1 | 11/2001 | Kim | |
| 2002/0015573 A1 * | 2/2002 | Ishibashi | 385/147 |
| 2002/0021467 A1 * | 2/2002 | Ofek et al. | 359/128 |
| 2002/0025041 A1 | 2/2002 | Tomita | |
| 2002/0097874 A1 | 7/2002 | Foden et al. | |
| 2002/0110245 A1 | 8/2002 | Gruia | |
| 2002/0141019 A1 | 10/2002 | Chang et al. | |
| 2003/0002074 A1 | 1/2003 | Nambu et al. | |
| 2003/0002670 A1 | 1/2003 | Wang | |
| 2003/0002674 A1 | 1/2003 | Nambu et al. | |
| 2003/0059157 A1 | 3/2003 | DeCusalis et al. | |
| 2003/0137944 A1 | 7/2003 | Medvinsky | |
| 2003/0215088 A1 | 11/2003 | Bao | |
| 2003/0231771 A1 | 12/2003 | Gisin et al. | |
| 2004/0005056 A1 | 1/2004 | Nishioka et al. | |
| 2004/0008843 A1 | 1/2004 | Van Enk | |
| 2004/0019676 A1 | 1/2004 | Iwatsuki et al. | |
| 2004/0165884 A1 | 8/2004 | Al-Chalabi | |
| 2004/0190725 A1 | 9/2004 | Yuan et al. | |
| 2005/0036624 A1 | 2/2005 | Kent et al. | |
| 2006/0252381 A1 | 11/2006 | Sasaoka et al. | |

OTHER PUBLICATIONS

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Experimental Quantum Cryptography," Journal of Cryptography's special issue after Eurocrypt '90, 28 pages (Sep. 1991).

Bennett, C.H., et al., "Generalized Privacy Amplification," IBM Research, 24 pages (May 31, 1995).

Bennett, C.H., et al., "Quantum Cryptography: Public Key Distribution and Coin Tossing," Proceedings of IEEE International Conference on Computers, Systems & Signal Processing, Bangalore, India, pp. 175-179, Dec. 10-12, 1984.

Bethune, D.S., et al., "An Autocompensating Fiber-Optic Quantum Cryptography System Based on Polarization Splitting of Light," IEEE Journal of Quantum Electronics, XX(Y):100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Crepeau, C., et al., "Secure Multi-party Quantum Computation," ACM, pp. 1-10 (2001).

Eisenberg, S., "Lucent Technologies names Cherry Murray physical sciences research vice president," Press Release (Mar. 28, 2000).

Ekert, A.K., "Quantum Cryptography Based on Bell's Theorem," Physical Review Letters, 67(6):661-663 (1991).

Elliott, C., "Building the quantum network," New J. Phys., 4:46 (2002).

Franson, J.D., "Bell Inequality for Position and Time," Physical Review Letters, 62(19):2205-2208 (1989).

Gisin, N., et al., "Quantum cryptography and long distance Bell experiments: How to control decoherence," Geneva, Switzerland; pp. 1-7 and 4 pages of drawings (Jan. 15, 1999).

Gisin, N., et al., "Quantum cryptography," Reviews of Modern Physics, 74:145-184 (2002).

Gottesman, D., et al., "Secure quantum key distribution using squeezed states," pp. 1-19 (Sep. 25, 2000).

Jennewein, T., et al., "Quantum Cryptography with Entangled Photons," Physical Review Letters, 84(20):4729-4732 (2000).

Lin, L.Y., et al., "Free-Space Micromachined Optical Switches for Optical Networking," IEEE Journal of Selected Topics in Quantum Electronics, 5(1):4-9 (1999).

Maurer, U., et al., "Information-Theoretic Key Agreement: From Weak to Strong Secrecy for Free," Computer Science Department, Swiss Federal Institute of Technology, 20 pages (2000).

Maurer, U.M., "Secret Key Agreement by Public Discussion From Common Information," IEEE Transactions on Information Theory, 39:733-742 (1993).

Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.

Naik, D.S., et al., "Entangled State Quantum Cryptography: Eavesdropping on the Ekert Protocol," Physical Review Letters, 84(20):4733-4736 (2000).

Ribordy, G., et al., "Long-distance entanglement-based quantum key distribution," Physical Review A, vol. 63, 012309-1-012309-12 (2001).

Rosen, E., et al., "Multiprotocol Label Switching Architecture," MPLS Architecture, 1-61 (Jan. 2001).

Scarani, V., et al., "Quantum Cryptography Protocols Robust Against Photon Number Splitting Attacks for Weak Lazer Pulse Implementations," Physical Review Letters, 92(5):057901-1 through 057901-4 (Feb. 2004).

Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.

Schneier, B., "Applied Cryptography," Second Edition, Chapter 10, Oct. 18, 1995, Wiley & Sons Publ., pp. 216-220.

Slutsky, B., et al., "Defense frontier analysis of quantum cryptographic systems," Applied Optics, 37(14):2869-2878 (1998).

Stucki, D., et al., "Quantum Key Distribution over 67 km with a plug&play system," New Journal of Physics, 41.1-41.8 (2002).

Tanzilli, S., et al., "PPLN waveguide for quantum communication," Eur. Phys. J.D., 18:155-160 (2002).

Tittel, W., et al., "Long-distance Bell-type tests using energy-time entangled photons," Physical Review A, 59(6):4150-4163 (1999).

Walker, J.A., "Telecommunications Applications of MEMS," mstnews, pp. 6-9 (Mar. 2000).

Xiao, L., et al., "Efficient Multi-Party Quantum Secret Sharing Schemes," pp. 1-7 (May 28, 2004).

Degermark, M., et al., "Small Forwarding Tables for Fast Routing Lookups," ACM, pp. 3-14 (1997).

Estrin, D., et al., "Security Issues in Policy Routing," IEEE, pp. 183-193 (1989).

Garcia-Luna-Aceves, J.J., et al., "Distributed, Scalable Routing Based on Vectors of Link States," IEEE Journal on Selected Areas in Communications, 13(8):1383-1395 (Oct. 1995).

Garcia-Luna-Aceves, J.J., et al., "Scalable Link-State Internet Routing," Network Protocols (Oct. 13-16, 1998).

Lakshman, T.V., et al., "High-Speed Policy-based Packet Forwarding Using Efficient Multi-dimensional Range Matching," Proceedings of the ACM SIGCOMM'98 conference on Applications, technologies, architectures and protocols for computer communication, pp. 203-214 (1998).

Lampson, B., et al., "IP Lookups Using Multiway and Multicolumn Search," IEEE/ACM Transactions on Networking, 7(3):324-334 (Jun. 1999).

Ramanathan, R., et al., "Hierarchically-organized, multihop mobile wireless networks for quality-of-service support," Mobile Networks and Applications, 3:101-119 (1998).

Tsai, W.T., "An Adaptive Hierarchical Routing Protocol," IEEE Transactions on Computers, 38(8):1059-1075 (Aug. 1989).

Waldvogel, M., et al., "Scalable High Speed IP Routing Lookups," ACM, pp. 25-36 (1997).

Bowers, J.E., "Optical Network and Component Trends," UCSB, NSF Workshop, 51 pages.

Honjo, T., et al., "Differential-phase-shift Quantum Key Distribution," NTT Technical Review, 2(12):26-33 (Dec. 2004).

Nambu, Y., et al., "BB84 Quantum Key Distribution System based on Silica-Based Planar Lightwave Circuits," Fundamental and Environmental Research Laboratories and Fiber Optic Devices Division, pp. 1-11.

Paniccia, M., "Silicon Integrated Photonics," UCSB, 30 pages, Feb. 2, 2005.

Tomita, A., et al., "Recent Progress in Quantum Key Transmission," NEC J. of Adv. Tech., 2(1):84-91 (Winter 2005).

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al. "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

Imamoglu, A., et al., "Turnstile Device for Heralded Single Photons: Coulomb Blockade of Electron and Hole Tunneling in Quantum Confined p-i-n Heterojunctions," Physical Review Letters, 72(2):210-213 (1994).

"Quantum Cryptography Defies Eavesdropping"; Collins, Graham; Physics Today; Nov. 1992; pp. 21-23.

"Quantum Public Key Distribution System"; IBM Technical Disclosure Bulletin; vol. 28, No. 7; Dec. 1985; pp. 3153-3163.

"Single Photon Interference in 10 km Long Optical Fibre Interferometer"; P.D. Townsend et al.; Electronics Letters; vol. 29, No. 7; Apr. 1993; pp. 834-835.

"Enhanced Single Photon Fringe Visibility in A 10 km Long Prototype Quantum Cryptography Channel"; P.D. Townsend et al.; Electronics Letters; vol. 29, No. 14; Jul. 1993; pp. 1291-1293.

"Secure Key Distribution System Based on Quantum Cryptography"; P.D. Townsend et al.; Electronics Letters; vol. 30, No. 10; May 1994; pp. 809-811.

Multi-User Quantum Cryptography on Optical Networks; Simon J.D. Phoenix et al.; Journal of Modern Optics; vol. 42, No. 6; Jun. 1995; pp. 1155-1163.

U.S. Appl. No. 10/271,103, entitled "Systems And Methods For Framing Quantum Cryptographic Links"; filed on Oct. 15, 2002; Oleksiy Pikalo et al.; 54 pages.

U.S. Appl. No. 10/271,150, entitled "Quantum Cryptographic System With Photon Counting Detector"; filed on Oct. 15, 2002; Brig Barnum Elliott et al.; 39 pages.

Brig B. Elliott et al.: "Path-Length Control in a Interferometric QKD Link," Quantum Information and Computation Conferences, Apr. 21-22, 2003; 11 pages.

"Violations of a New Inequality for Classical Fields," Franson, J.D.; John Hopkins University; NTIS NASA publication; Goddard Space Flight Center; Workshop on Squeezed States and Uncertainty Relations; Feb. 1991; pp. 23-32.

U.S. Appl. No. 10/716,747, entitled "Systems And Methods For Implementing Training Frames For Quantum Cryptographic Links," filed Nov. 18, 2003; Milton Alexander Colvin et al.; 70 pages.

U.S. Appl. No. 09/943,709, entitled "Systems And Methods For Path Set-Up In A Quantum Key Distribution Network," filed Aug. 31, 2001; Brig Barnum Elliott; 48 pages.

Office action issued on Oct. 23, 2007 for U.S. Appl. No. 10/324,355.
Office action issued on Oct. 29, 2007 for U.S. Appl. No. 10/786,314.
Office action issued on Dec. 27, 2007 for U.S. Appl. No. 10/795,313.
Office action issued on Mar. 27, 2008 for U.S. Appl. No. 10/799,177.
Office action issued on Sep. 6, 2007 for U.S. Appl. No. 10/803,509.
Office action issued on Jul. 10, 2007 for U.S. Appl. No. 10/795,313.
Office action issued on May 25, 2007 for U.S. Appl. No. 10/218,652.

* cited by examiner

SIMPLE UNTRUSTED NETWORK FOR QUANTUM CRYPTOGRAPHY

The instant application claims the benefit of U.S. Provisional Application No. 60/456,822, filed on Mar. 21, 2003, the disclosure of which is incorporated by reference herein in its entirety, U.S. Provisional Application No. 60/456,852, filed Mar. 21, 2003, the disclosure of which is incorporated by reference herein in its entirety, and U.S. Provisional Application No. 60/456,624, filed Mar. 21, 2003, the disclosure of which is incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Project Agency (DARPA).

TECHNICAL FIELD

The present invention relates generally to cryptographic systems and, more particularly, to systems and methods for implementing a Quantum Cryptographic Key Distribution Network with untrusted switches.

BACKGROUND OF THE INVENTION

Within the field of cryptography, it is well recognized that the strength of any cryptographic system depends, among other things, on the key distribution technique employed. For existing encryption to be effective, such as a symmetric key system, two communicating parties must share the same key and that key must be protected from access by others. The key must, therefore, be distributed to each of the parties.

FIG. 1 shows one form of a conventional key distribution process. As shown in FIG. 1, for a party, Bob, to decrypt ciphertext encrypted by a party, Alice, Alice or a third party must share a copy of the key with Bob. This distribution process can be implemented in a number of conventional ways including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old; and 5) Alice and Bob may agree on a shared key via a one-way mathematical algorithm, such as Diffie-Hellman key agreement.

All of these distribution methods are vulnerable to interception of the distributed key by an eavesdropper, Eve, or by Eve "cracking" the supposedly one-way algorithm. Eve can eavesdrop and intercept or copy a distributed key and then subsequently decrypt any intercepted ciphertext that is sent between Bob and Alice. In conventional cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

An existing quantum key distribution (QKD) scheme involves a quantum channel, through which Alice and Bob send keys using polarized or phase encoded photons, and a public channel, through which Alice and Bob send ordinary messages. Since these polarized or phase encoded photons are employed for QKD, they are often termed QKD photons. The quantum channel is a path, such as through air or an optical fiber, that attempts to minimize the QKD photons' interaction with the environment. The public channel may comprise a channel on any type of communication network, such as a Public Switched Telephone network, the Internet, or a wireless network.

An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

FIGS. 2 and 3 illustrate an existing scheme 200 for quantum key distribution in which the polarization of each photon is used for encoding cryptographic values. To begin the quantum key distribution process, Alice generates random bit values and bases 205 and then encodes the bits as polarization states (e.g., 0°, 45°, 90°, 135°) in sequences of photons sent via the quantum channel 210 (see row 1 of FIG. 3). Alice does not tell anyone the polarization of the photons she has transmitted. Bob receives the photons and measures their polarization along either a rectilinear or diagonal basis that is randomly selected with substantially equal probability. Bob records his chosen basis (see row 2 of FIG. 3) and his measurement results (see row 3 of FIG. 3).

Bob and Alice discuss 215, via the public channel 220, which basis he has chosen to measure each photon. Bob, however, does not inform Alice of the result of his measurements. Alice tells Bob, via the public channel, whether he has made the measurement along the correct basis (see row 4 of FIG. 3). In a process called "sifting" 225, both Alice and Bob then discard all cases in which Bob has made the measurement along the wrong basis and keep only the ones in which Bob has made the measurement along the correct basis (see row 5 of FIG. 3).

Alice and Bob then estimate 230 whether Eve has eavesdropped upon the key distribution. To do this, Alice and Bob must agree upon a maximum tolerable error rate. Errors can occur due to the intrinsic noise of the quantum channel and eavesdropping attack by a third party. Alice and Bob choose randomly a subset of photons m from the sequence of photons that have been transmitted and measured on the same basis. For each of the m photons, Bob announces publicly his measurement result. Alice informs Bob whether his result is the same as what she had originally sent. They both then compute the error rate of the m photons and, since the measurement results of the m photons have been discussed publicly, the polarization data of the m photons are discarded. If the computed error rate is higher than the agreed upon tolerable error rate (typically no more than about 15%), Alice and Bob infer that substantial eavesdropping has occurred. They then discard the current polarization data and start over with a new sequence of photons. If the error rate is acceptably small, Alice and Bob adopt the remaining polarizations, or some algebraic combination of their values, as secret bits of a shared secret key 235, interpreting horizontal or 45 degree polarized photons as binary 0's and vertical or 135 degree photons as binary 1's (see row 6 of FIG. 3).

Alice and Bob may also implement an additional privacy amplification process 240 that reduces the key to a small set of derived bits to reduce Eve's knowledge of the key. If, subsequent to discussion 215 and sifting 225, Alice and Bob adopt n bits as secret bits, the n bits can be compressed using, for example, a hash function. Alice and Bob agree upon a publicly chosen hash function $f$ and take $K=f$(n bits) as the shared r-bit length key K. The hash function randomly redistributes the n bits such that a small change in bits produces a large change in the hash value. Thus, even if Eve determines a number of bits of the transmitted key through eavesdropping, and also knows the hash function $f$ she still will be left with very little knowledge regarding the content of the hashed r-bit key K. Alice and Bob may further authenticate the public channel transmissions to prevent a "man-in-the-middle" attack in which Eve masquerades as either Bob or Alice.

Existing quantum cryptographic systems generally provide a dedicated, point-to-point link between endpoints. This approach makes it both difficult and expensive to build large key distribution systems, because every endpoint would need a dedicated quantum channel to each other endpoint. Some existing techniques show means by which switched networks could be built for quantum cryptography, which substantially solved this problem. However these switched networks required protocol interactions between endpoints and switches, and/or distributed routing protocols, in order to set up end to end sessions between quantum cryptographic endpoints.

There is a need for a very simple quantum cryptographic network, which requires neither a protocol interaction between endpoints and switches nor a distributed routing protocol. Such a network would greatly simplify both the endpoints and the switches.

SUMMARY OF THE INVENTION

A method and system for distributing quantum cryptographic keys among a group of user devices through a switch connected to the user devices are provided.

In one aspect of the invention, a switch establishes a connection between two of a group of user devices. A Quantum Key Distribution (QKD) session is established between the two user devices to facilitate sharing of secret key material between the two user devices. Connections and QKD sessions are established for different pairs of the user devices.

In another aspect of the invention, a group of user devices and a switch are provided. Each of the user devices is configured to have a connection through the switch. The switch includes a connection establisher configured to establish a connection between pairs of the user devices according to a schedule. One of the user devices includes a QKD session manager and a secret sharer. The QKD session manager is configured to establish a QKD session with another one of the user devices via the established connection. The secret sharer is configured to obtain shared secret information with the another one of the user devices.

In a third aspect of the invention, a switch is provided to establish a connection between pairs of quantum cryptographic user devices. The switch includes a connection establisher configured to establish a connection between pairs of the quantum cryptographic user devices according to a schedule.

In a fourth aspect of the invention, a user device is provided. The user device is configured to communicate with a second user device via a QKD switch, which is configured to switch connections among a group of user devices, including the user device and the second user device, according to a schedule. The user device includes a QKD session manager and a secret sharer. The QKD session manager configured to establish a QKD session with the second user device via the QKD switch. The secret sharer is configured to obtain shared secret information with the second user device over the QKD session passing through the QKD switch.

In a fifth aspect of the invention, a system for distributing quantum cryptographic keys in an untrusted network is provided. The system includes means for establishing a connection between pairs of the user devices according to a schedule, means for establishing a QKD session between a pair of the user devices via the established connection, and means for agreeing on secret information during the QKD session.

In a sixth aspect of the invention, a computer-readable medium is provided. The computer-readable medium has instructions stored thereon for at least one processor to perform a method. The method includes successively establishing a connection between pairs of quantum cryptographic user devices according to a schedule.

In a seventh aspect of the invention, a computer-readable medium is provided. The computer-readable medium has instructions stored thereon for at least one processor to perform a method. The method includes establishing a QKD session between a first user device and a second user device via a QKD switch, which is configured to switch connections among a group of user devices, including the first and the second user devices, according to a schedule, and agreeing on secret information derived from the QKD session between the first user device and the second user device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims Systems and methods consistent with the invention include user devices or Quantum Cryptographic Key (QKD) endpoints arranged in a star topology around QKD switches such that there is at least one switch between one user device and another user device with which it will perform QKD. The systems and methods provide an automatic cryptographic key distribution system that is flexible and inexpensive and serves as a useful building block for making extremely secure communications networks.

Exemplary Network

Figure 1:
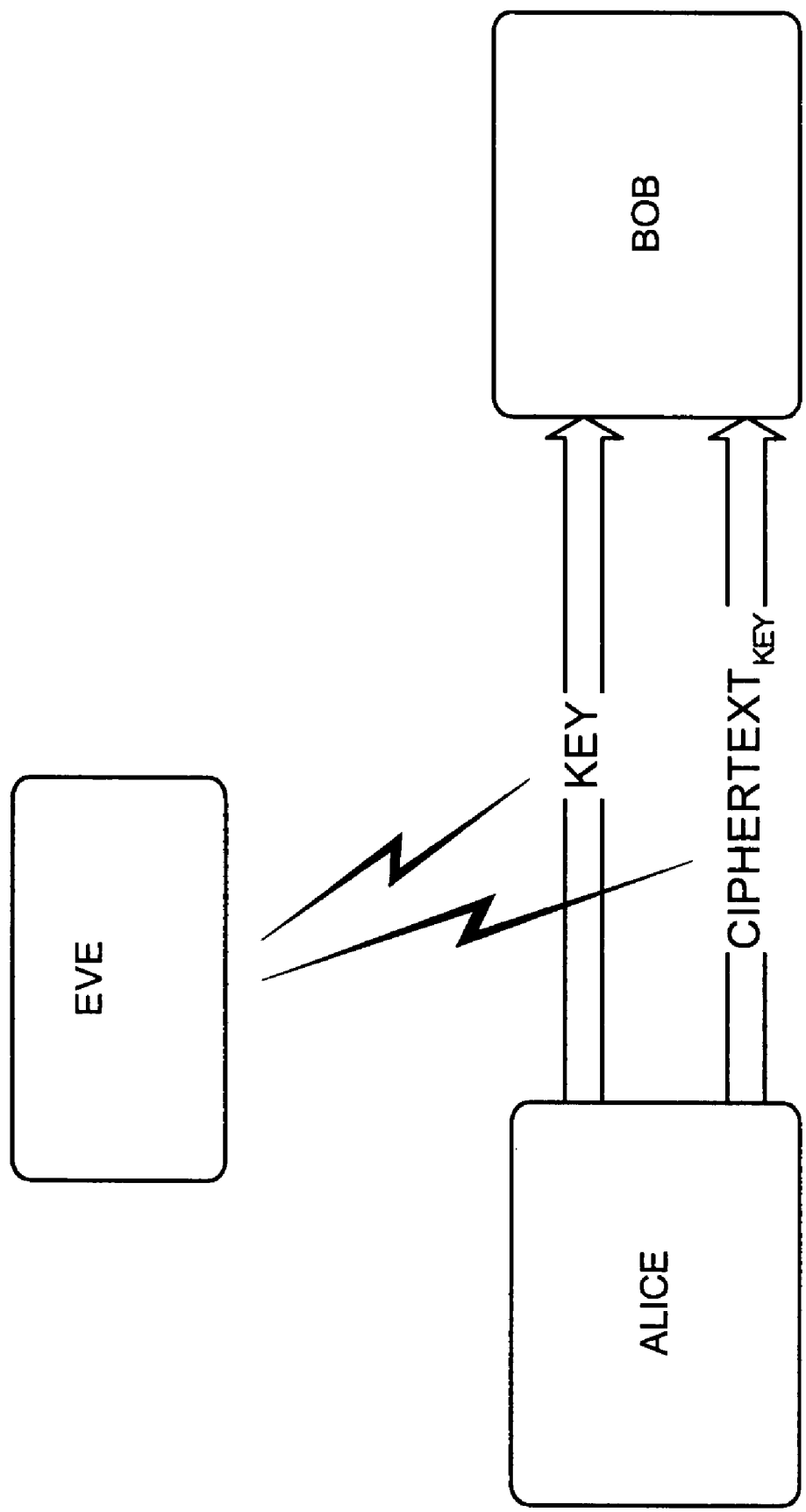
FIG. 1 illustrates an existing quantum cryptographic key distribution and ciphertext communication.
Figure 2:
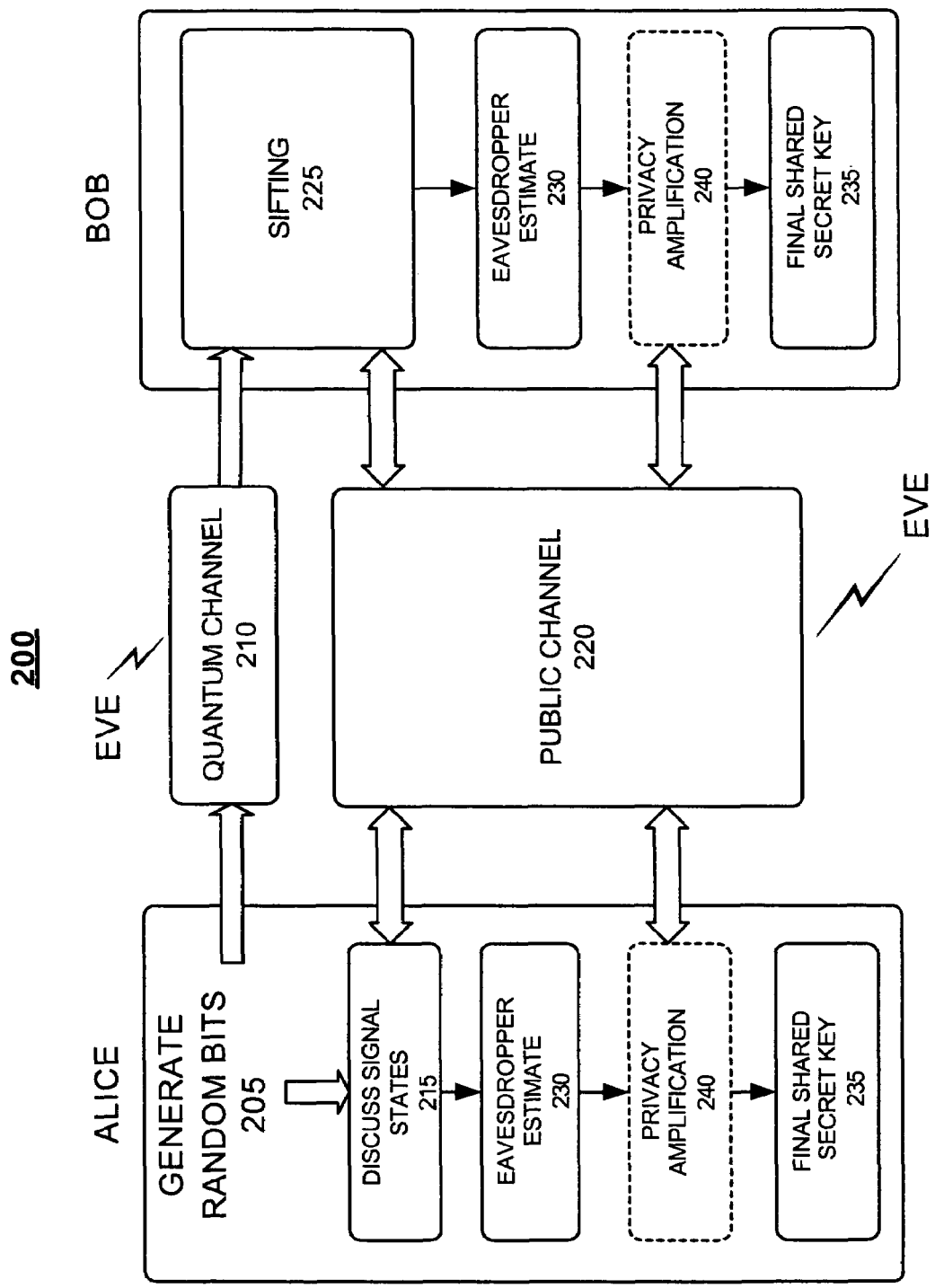
FIG. 2 illustrates an existing quantum cryptographic key distribution (QKD) process.
Figure 3:
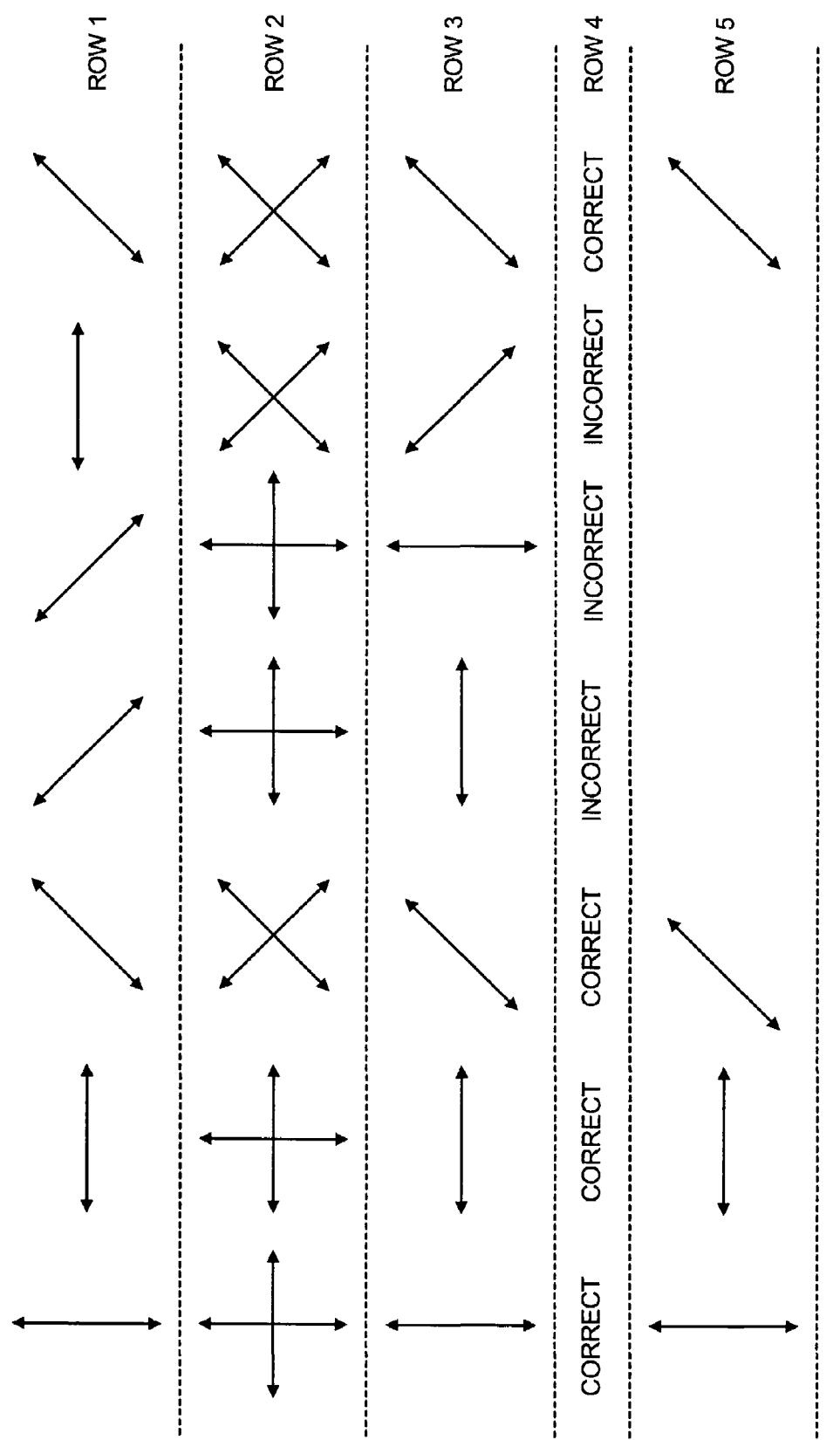
FIG. 3 illustrates existing quantum cryptographic sifting and error correction.
Figure 4:
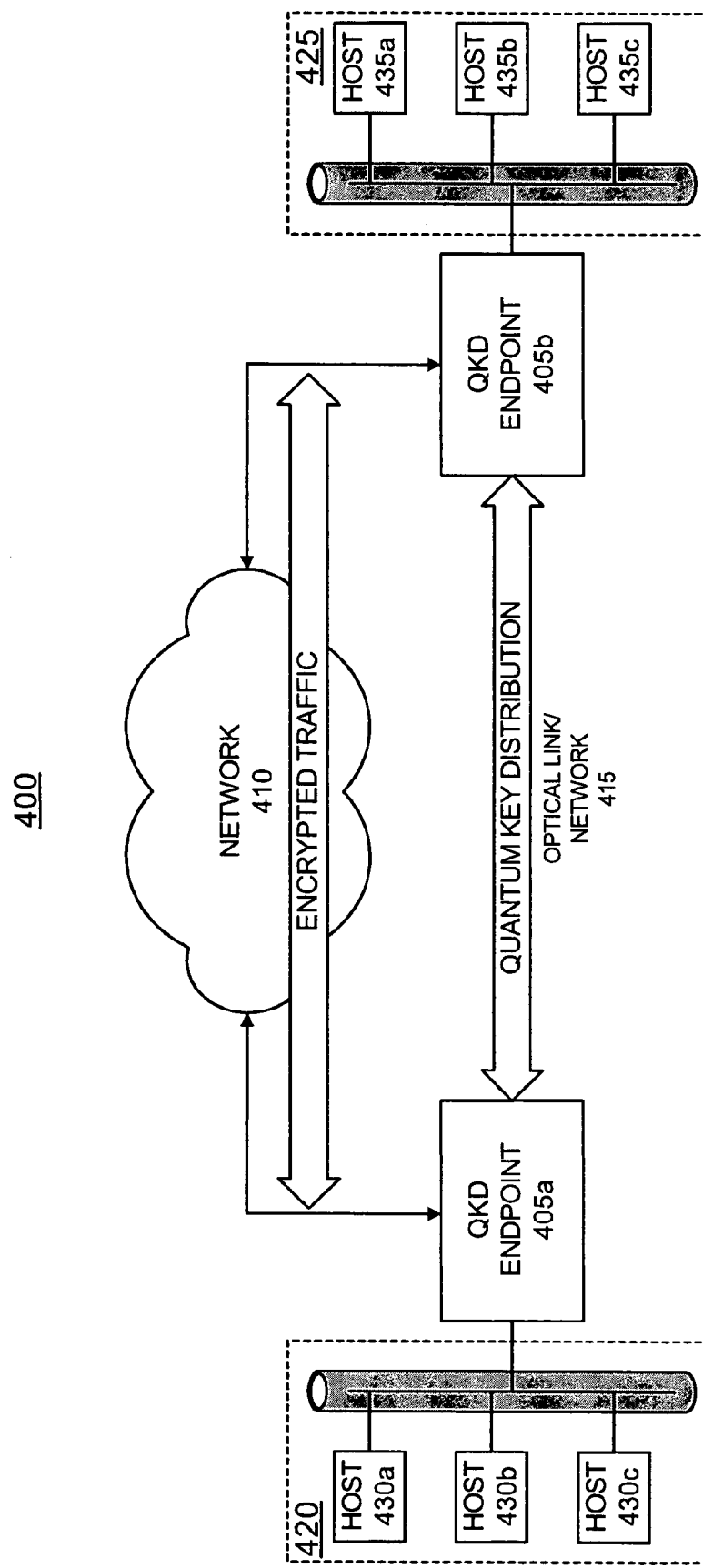
FIG. 4 illustrates an exemplary network in which systems and methods, consistent with the present invention, may be implemented.

FIG. 4 illustrates an exemplary network 400 in which systems and methods, consistent with the present invention, that distribute encryption keys via quantum cryptographic mechanisms can be implemented. Network 400 may include QKD endpoints 405a and 405b connected via a network 410 and an optical link/network 415. QKD endpoints 405a and 405b may each include a host or a server. QKD endpoints 405a and 405b may further connect to local area networks (LANs) 420 or 425. LANs 420 and 425 may further connect with hosts 430a-430c and 435a-435c, respectively.

Network 410 can include one or more networks of any type, including a Public Land Mobile Network (PLMN), Public Switched Telephone Network (PSTN), LAN, metropolitan area network (MAN), wide area network (WAN), Internet, or Intranet. Network 410 may also include a dedicated fiber link or a dedicated freespace optical or radio link. If implemented as a PLMN, network 410 may further include packet-switched sub-networks, such as, for example, General Packet Radio Service (GPRS), Cellular Digital Packet Data (CDPD), and Mobile IP sub-networks.

Optical link/network 415 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, through the atmosphere or outer space, or even through water or other transparent media. As another alternative, the link may include a hollow optical fiber that may be lined with photonic band-gap material.

Furthermore, optical link/network 415 may include a QKD network that includes one or more QKD switches (not shown) for distributing encryption keys between a source QKD endpoint (e.g., QKD endpoint 405a) and a destination QKD endpoint (e.g., QKD endpoint 405b). Such a QKD network may include the QKD network described in co-pending U.S. patent application Ser. Nos. 09/944,328, entitled "QUANTUM CRYPTOGRAPHIC KEY DISTRIBUTION NETWORKS," filed Aug. 31, 2001, 09/943,709; entitled "SYSTEMS AND METHODS FOR PATH SET-UP IN A QUANTUM KEY DISTRIBUTION NETWORK," filed Aug. 31, 2001, 10/384,502; entitled "AUTOCONFIGURATION VIA QUANTUM CRYPTOGRAPHIC LINK FRAMING," filed Mar. 7, 2003; 10/716,747, entitled "SYSTEMS AND METHODS FOR IMPLEMENTING TRAINING FRAMES FOR QUANTUM CRYPTOGRAPHIC LINKS," filed Nov. 18, 2003; 10/271,103, entitled "SYSTEMS AND METHODS FOR FRAMING QUANTUM CRYPTOGRAPHIC LINKS," filed Oct. 15, 2002; 10/716,078, entitled "SYSTEM AND METHODS FOR IMPLEMENTING PATH LENGTH CONTROL FOR QUANTUM CRYPTOGRAPHIC SYSTEMS," filed Nov. 18, 2003; 10/324,040, entitled "KEY TRANSPORT IN QUANTUM CRYPTOGRAPHIC NETWORKS," filed Dec. 20, 2002, and 10/803,509, entitled "SYSTEMS AND METHODS FOR QUANTUM CRYPTOGRAPHIC KEY TRANSPORT," filed Mar. 18, 2004. All of the above U.S. patent applications are herein incorporated by reference in their entirety.

QKD endpoints 405 may distribute Quantum Cryptographic keys via optical link/network 415. Subsequent to quantum key distribution via optical link/network 415, QKD endpoint 405a and QKD endpoint 405b may encrypt traffic using the distributed key(s) and transmit the traffic via network 410.

It will be appreciated that the number of components illustrated in FIG. 4 is provided for explanatory purposes only. A typical network may include more or fewer components that are illustrated in FIG. 4.

Figure 5:
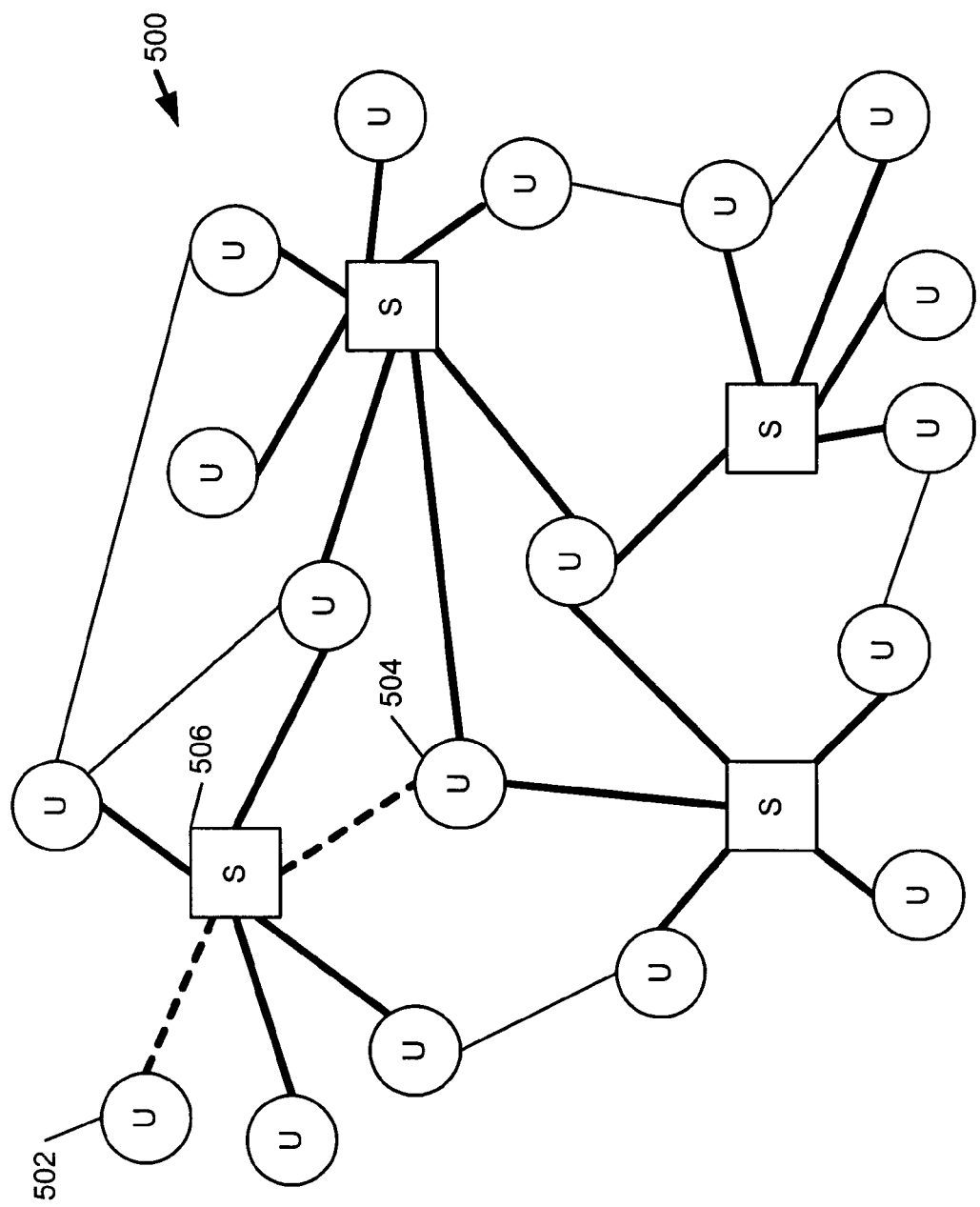
FIG. 5 illustrates a portion of an exemplary network in which QKD endpoints are arranged in a star topology around QKD switches.

FIG. 5 shows a portion of an exemplary network 500, which may be included in optical link/network 415. In network 500, QKD endpoints or user devices (U) are arranged in a star topology around QKD switches (S). Switched QKD links are shown by heavy lines and point to point QKD links are shown by light lines. A dashed line shows a switched QKD link between user device 502 and user device 504 through switch 506. A given QKD endpoint or user device may, in general, have any number of QKD interfaces. Some of the interfaces may be connected to a switch and hence be switched connections, while others may be directly connected to other QKD endpoints. Some of the connections may be via fiber, for example, by phase modulation with Mach-Zehnder interferometers, while others may be in free space, for example, using polarization modulation.

Exemplary QKD Endpoint

Figure 6:
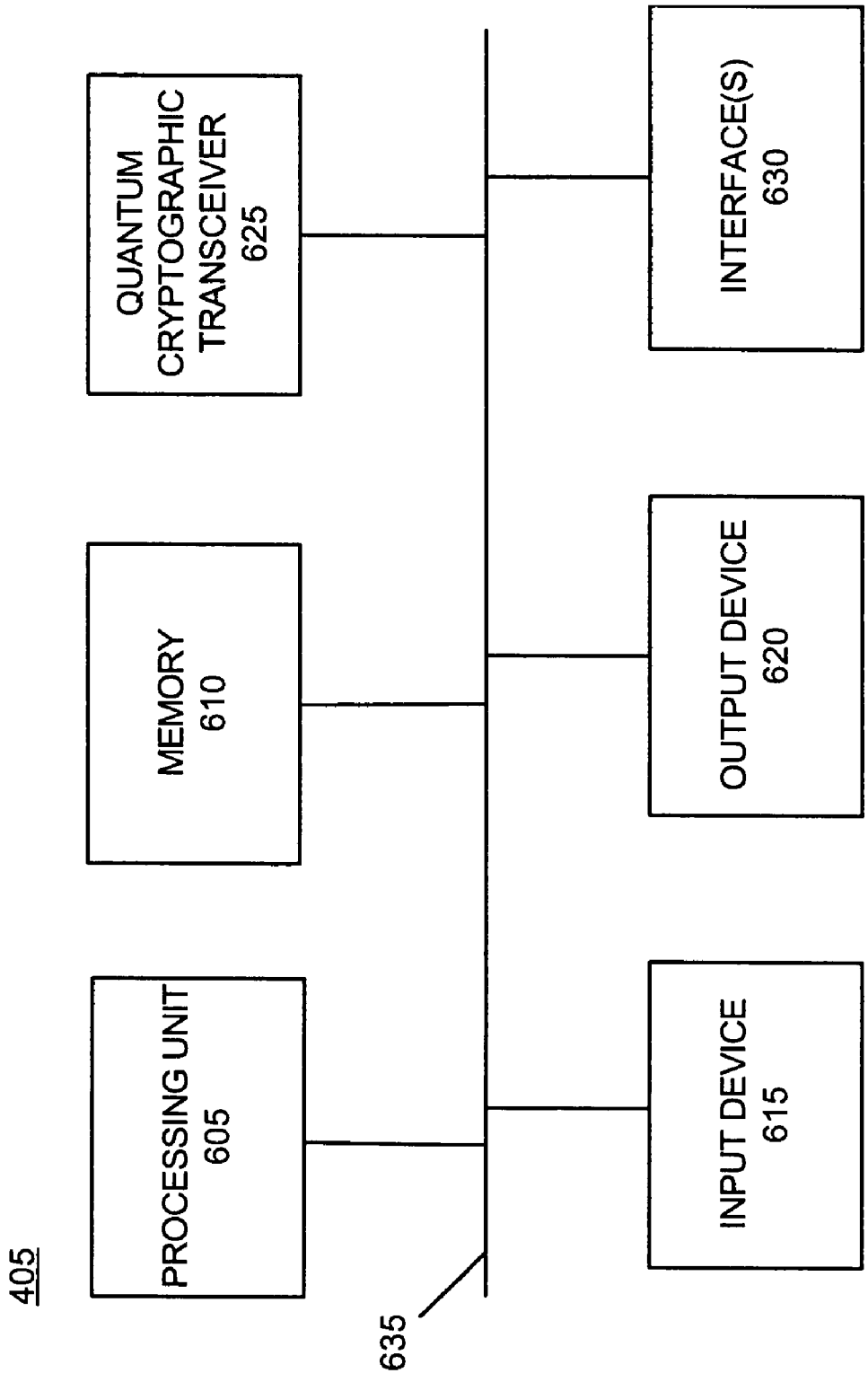
FIG. 6 illustrates an exemplary configuration of a QKD endpoint of FIG. 4 consistent with the present invention.

FIG. 6 illustrates exemplary components of a QKD endpoint 405 consistent with the present invention. QKD endpoint 405 may include a processing unit 605, a memory 610, an input device 615, an output device 620, a quantum cryptographic transceiver 625, an interface(s) 630 and a bus 535. Processing unit 605 may perform all data processing functions for inputting, outputting, and processing of QKD endpoint data. Memory 610 may include Random Access Memory (RAM) that provides temporary working storage of data and instructions for use by processing unit 605 in performing processing functions. Memory 610 may additionally include Read Only Memory (ROM) that provides permanent or semi-permanent storage of data and instructions for use by processing unit 605. Memory 610 can also include large-capacity storage devices, such as a magnetic and/or optical recording medium and its corresponding drive.

Input device 615 permits entry of data into QKD endpoint 405 and may include a user interface (not shown). Output device 620 permits the output of data in video, audio, and/or hard copy format. Quantum cryptographic transceiver 625 may include mechanisms for transmitting and receiving encryption keys using quantum cryptographic techniques. Interface(s) 630 may interconnect QKD endpoint 405 with link/network 415. Bus 635 interconnects the various components of QKD endpoint 405 to permit the components to communicate with one another.

Exemplary Quantum Cryptographic Transceiver

Figure 7:
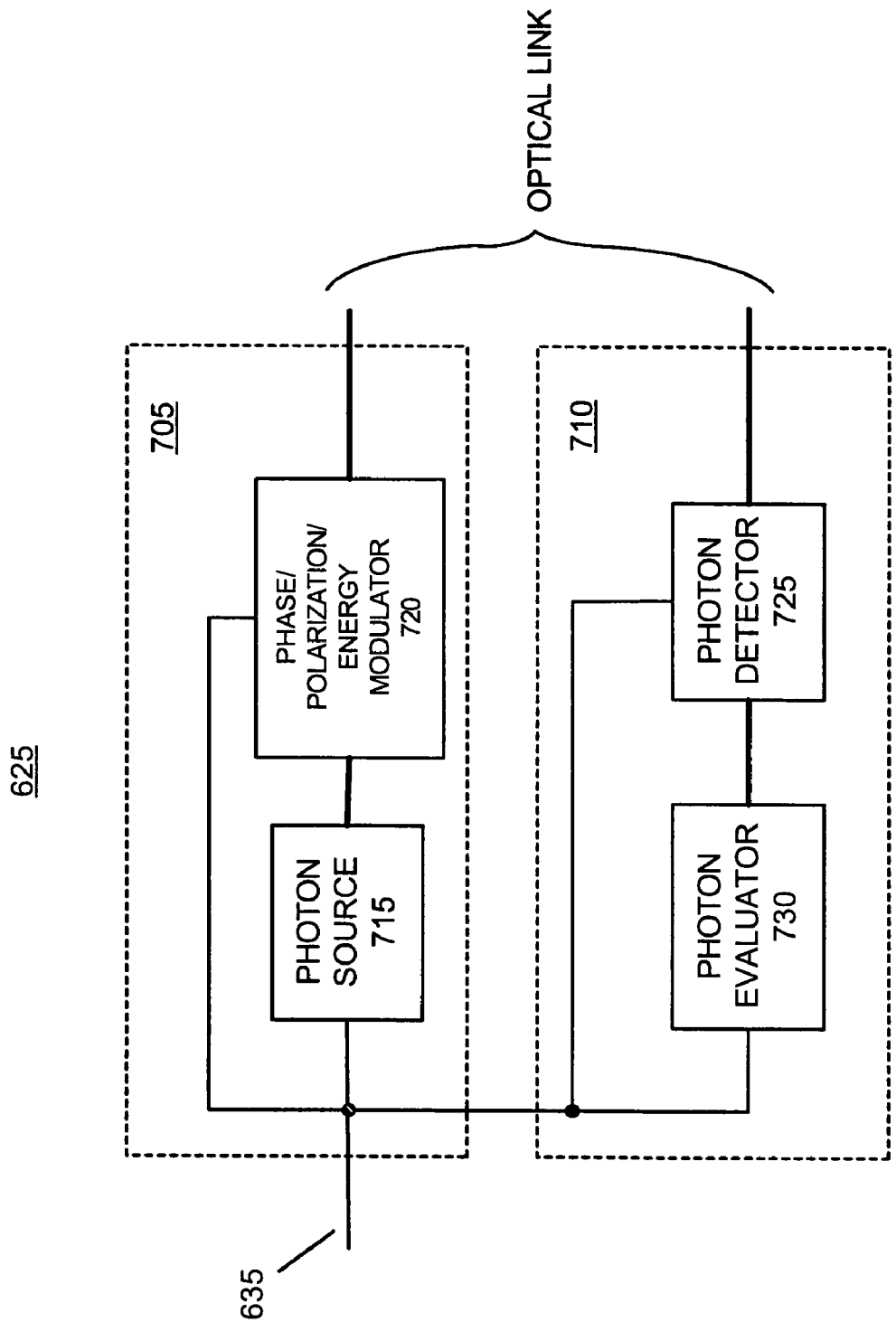
FIG. 7 illustrates exemplary components of the quantum cryptographic transceiver of FIG. 6 consistent with the present invention.

FIG. 7 illustrates exemplary components of quantum cryptographic transceiver 625 of QKD endpoint 405 consistent with the present invention. Quantum cryptographic transceiver 625 may include a QKD transmitter 705 and a QKD receiver 710. QKD transmitter 705 may include a photon source 715 and a phase/polarization/energy modulator 720. Photon source 715 can include, for example, a conventional laser. Photon source 715 may produce photons according to instructions provided by processing unit 605. Photon source 715 may produce photons of light with wavelengths throughout the electromagnetic spectrum, including light in the human visible spectrum and light beyond the human-visible spectrum, such as, for example, infrared or ultraviolet light. Phase/polarization/energy modulator 720 can include, for example, conventional Mach-Zehnder interferometers. Phase/polarization/energy modulator 720 may encode outgoing photons from the photon source according to commands received from processing unit 605 for transmission across an optical link, such as link 415.

QKD receiver 710 may include a photon detector 725 and a photon evaluator 730. Photon detector 725 can include, for example, conventional avalanche photo detectors (APDs) or conventional photo-multiplier tubes (PMTs). Photon detector 725 can also include cryogenically cooled detectors that sense energy via changes in detector temperature or electrical resistivity as photons strike the detector apparatus. Photon detector 725 can detect photons received across the optical link. Photon evaluator 730 can include conventional circuitry for processing and evaluating output signals from photon detector 725 in accordance with quantum cryptographic techniques.

Although this exemplary description is based on a "one way" quantum cryptographic system in which one device contains a laser source and the other contains detectors, the transceivers may also be based on so-called "plug and play" technology in which one device contains both a source and detectors, and the other device contains an attenuator and Faraday mirror or other retroreflector. Implementations of this invention may use the various forms of quantum cryptographic links.

Exemplary QKD Switch

Figure 8:
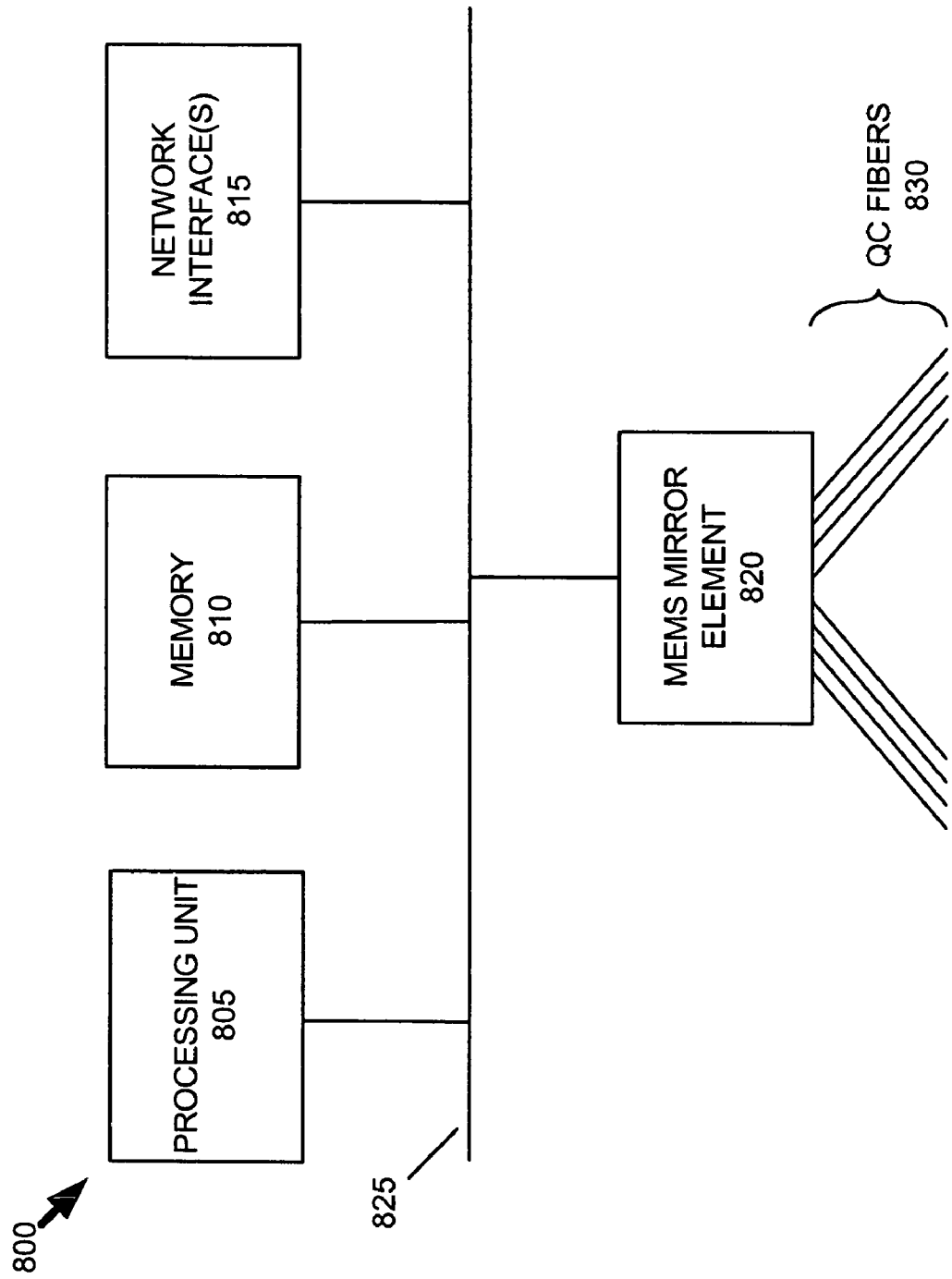
FIG. 8 illustrates an exemplary configuration of an untrusted QKD switch consistent with the present invention.

FIG. 8 illustrates exemplary components of a QKD switch 800 that may be used within optical link/network 415 according to an implementation consistent with the present invention. QKD switch 800 may include a processing unit 805, a memory 810, a network interface(s) 815, a Micro-Electro-Mechanical System (MEMS) mirror element 820, and a bus 825. MEMS mirror element 820 may be interconnected with one or more links that may include quantum cryptographic (QC) fibers 830.

Processing unit 805 may perform all data processing functions for inputting, outputting, and processing of QKD switch data. Memory 810 may include Random Access Memory (RAM) that provides temporary working storage of data and instructions for use by processing unit 805 in performing processing functions. Memory 810 may additionally include Read Only Memory (ROM) that provides permanent or semi-permanent storage of data and instructions for use by processing unit 805. Memory 810 can also include large-capacity storage devices, such as a magnetic and/or optical recording medium and its corresponding drive.

Network interface(s) 815 interconnects QKD switch 800 with network 410. MEMS mirror element 720 may include an array of optical switching mirrors such as, for example, any of those disclosed in U.S. Pat. Nos. 5,960,133, 5,960,131, 6,005, 993, 6,154,586, and 5,911,018. MEMS mirror element 820 directs photons, containing quantum encryption keys encoded via phase and/or polarization states, through a path along a fiber of QC fibers 830 in QKD optical link/network 415 according to instructions from processing unit 805. Bus 825 interconnects the various components of QKD switch 800 to permit the components to communicate with one another. QC fibers 830 may include one or more optical fibers. Note that many other methods may be employed instead of MEMS mirrors in order to perform optical switching, such as bubbles or mechanical movement of fibers. Implementations of this invention work equally well with all such methods.

Exemplary User Device

Figure 9:
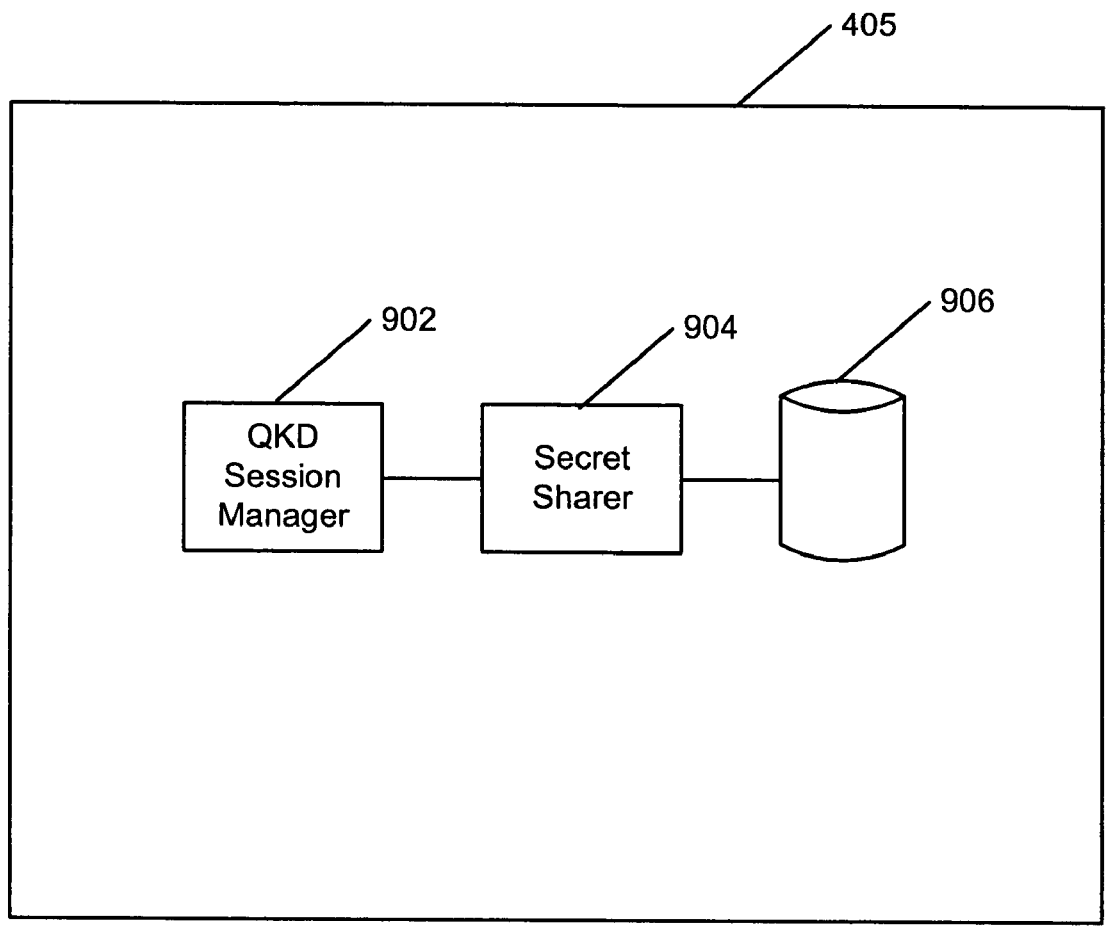
FIG. 9 is a functional block diagram of an exemplary QKD endpoint.

FIG. 9 illustrates a functional block diagram of exemplary user device, QKD endpoint 405, of FIG. 4, which may be a QKD transmitter, a QKD receiver, or a QKD transceiver.

User device 405 may include QKD session manager 902, secret sharer 904, and secret database 906. QKD session manager 906 may establish, resume, and maintain QKD sessions once a connection to another device is established via a switch. Secret sharer 904 may facilitate agreement of shared, secret cryptographic keys derived from raw material conveyed via the quantum channel. Shared secret database 906 may reside in memory, such as RAM or ROM, or may reside on magnetic media, optical media or any other storage media. This database may include blocks of shared secret bits, along with identifiers (such as sequence numbers) for the secret bits. It may also include information needed for the "work in progress" used to obtain shared secret bits, such as current status of sifting protocols, error detection and correction protocols, and so forth.

In a user device that includes a QKD transmitter, QKD session manager 902 may attempt to initiate a session with a peer user device through the connection established by the switch, or resume a previously suspended session. Secret sharer 904 may retrieve secret information pertaining to the peer user device from shared secret database 906 and may cause the data to be transmitted to the peer user device via photons through the QKD switch.

In a user device that includes a QKD receiver, QKD session manager 902 may wait for a QKD transmitter in a peer user device to establish a QKD session. QKD secret sharer 904 may receive shared secret information from the peer user device and store it in shared secret database 906 for the peer user device. QKD secret sharer 904 may also determine whether an ID in a received frame matches an identifier (ID) in a preceding received frame in order to determine whether communications to another peer user device has begun. In such a case it may notify the new peer transmitter, by means of messages through the public channel, that another session has begun, i.e., that the switch has formed a new connection between user devices.

A user device, which includes a QKD transceiver, may perform either of the transmitter and the receiver functions of the QKD session manager and secret sharer 904. Alternatively a user device may include only a receiver, or set of receivers, or only a transmitter, or set of transmitters, or a modulating retroreflector as in "plug and play" QKD systems.

Exemplary Switch

Figure 10:
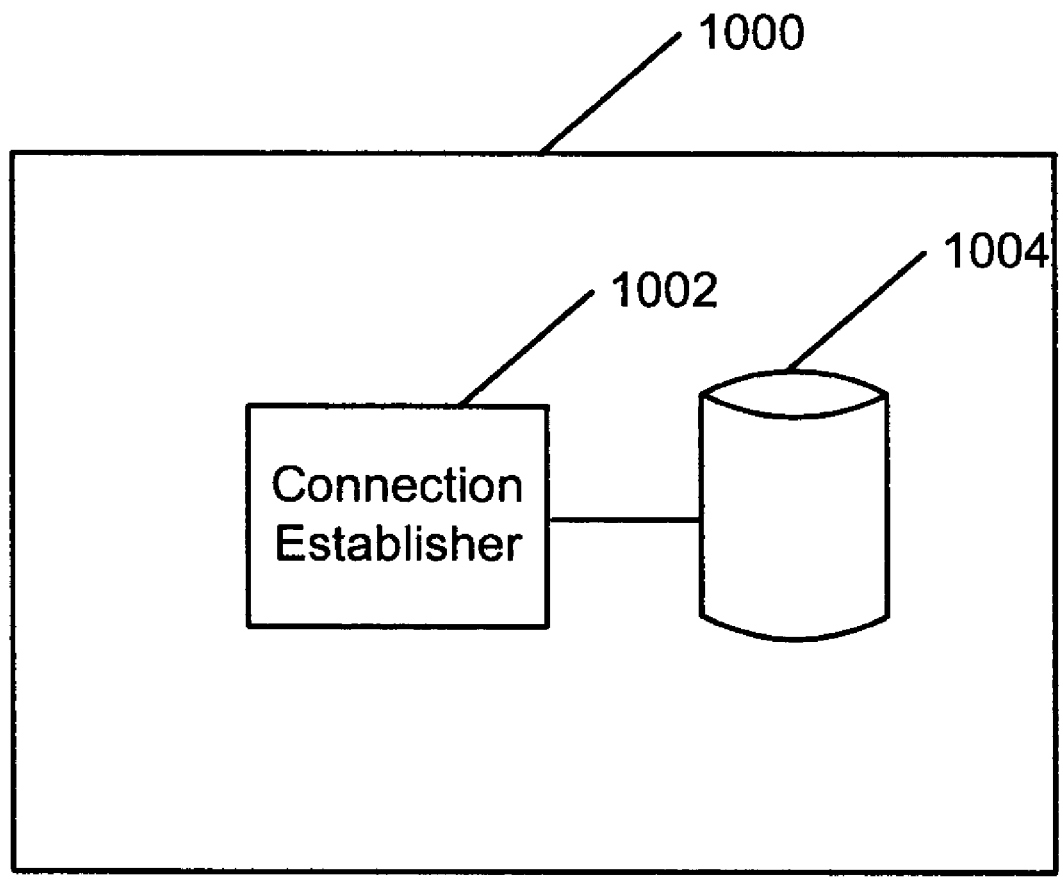
FIG. 10 is a functional block diagram of an exemplary QKD switch.

FIG. 10 illustrates a functional block diagram of exemplary switch 1000, which may be used with embodiments of the invention. Switch 1000 includes connection establisher 1002 which establishes connections with pairs of user devices according to a schedule. The schedule may be in a database 1004 in a storage medium. The storage medium may be memory 810, which may include magnetic medium, RAM or ROM, optical medium or any other storage device. The schedule may indicate an order for establishing connections to pairs of user devices and a length of time for allowing the connections to remain established before switching to a new connection. Further, the schedule may provide for some sets of user devices to be connected more frequently, or for longer periods of time, with one another through the switch than other sets of user devices.

Figure 11:
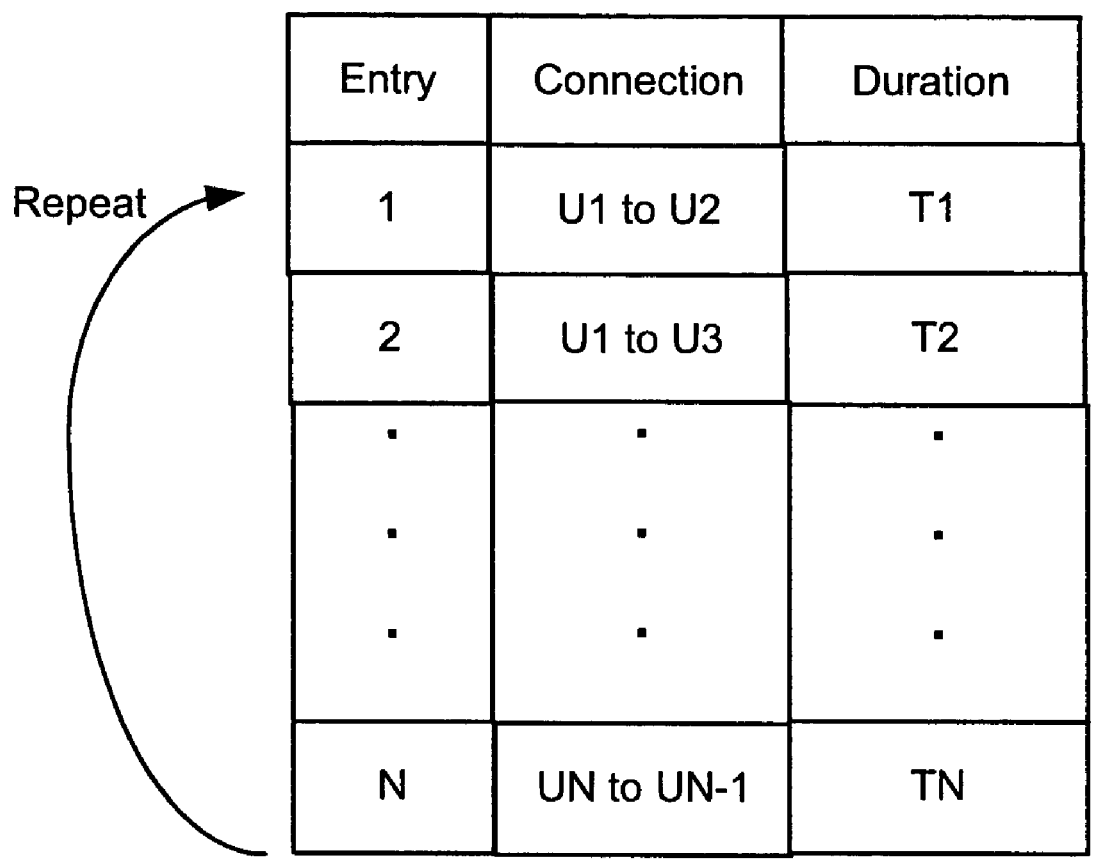
FIG. 11 is an exemplary schedule consistent with the present invention.

FIG. 11 illustrates an exemplary schedule consistent with the principles of the invention. The first entry of the exemplary schedule indicates that switch 1000 will first connect user devices $U_1$ and $U_2$ for a time period of T1. According to entry 2, switch 1000 will connect user devices $U_1$ and $U_3$ for a time period of T2. The Nth entry of the table indicates that switch 1000 will connect user devices $U_N$ and $U_{N-1}$ for a time period of TN. Because entry N is the last entry, switch 1000 would then repeat the schedule, starting with entry 1.

Exemplary Operation

Figure 12:
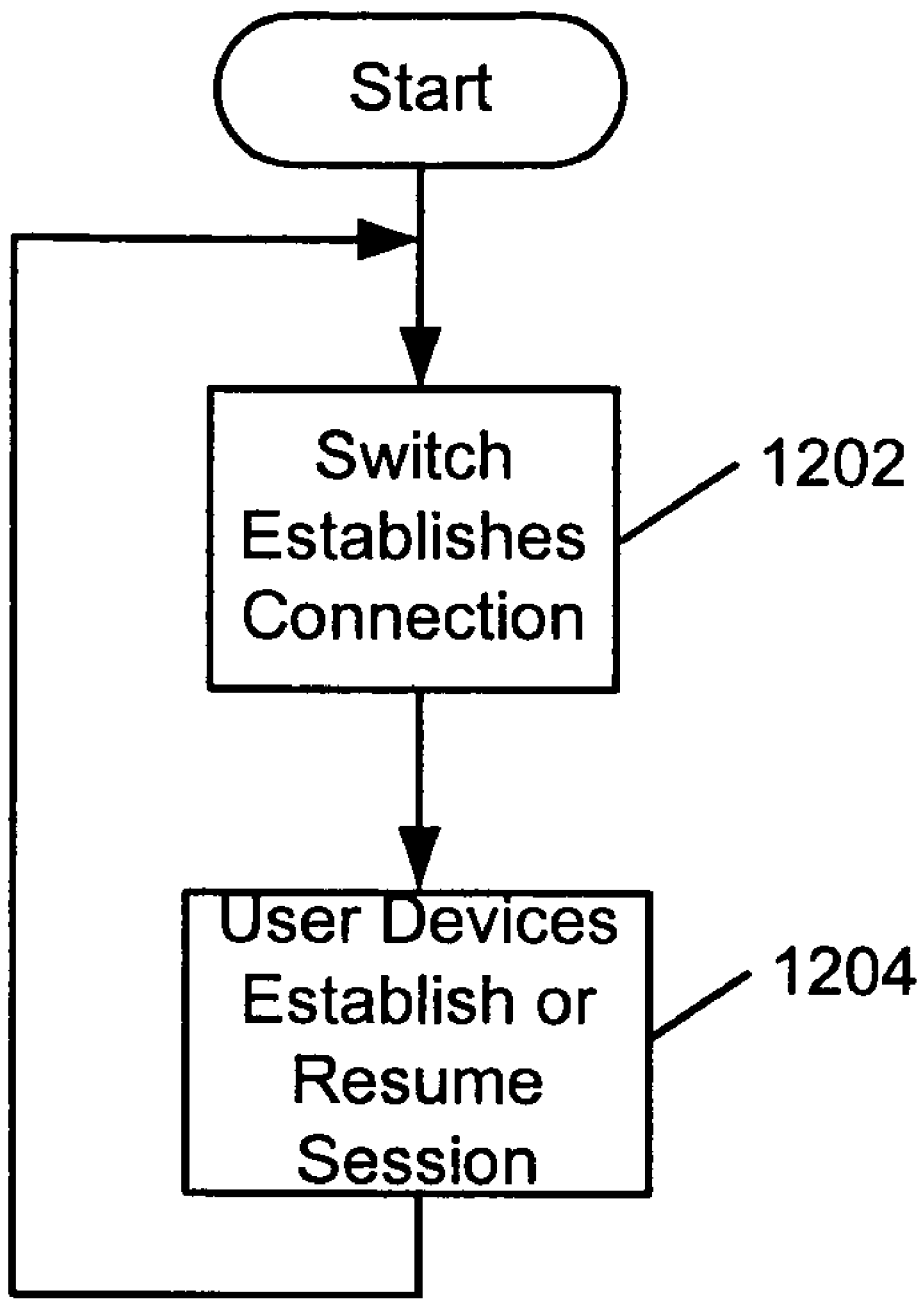
FIG. 12 is an exemplary flowchart illustrating exemplary high-level processing consistent with the present invention.

FIG. 12 illustrates operation of an exemplary switch and user devices consistent with the principles of the invention. At act 1202, the switch establishes a new connection between two user devices attached to the switch. At act 1204, the user devices detect that a new connection is up and establishes or resumes a QKD session. The user devices then exchange QKD protocol information e.g. for as long as that connection persists. Acts 1202-1204 are then repeated for each connection between pairs user devices attached to the switch.

Figure 13:
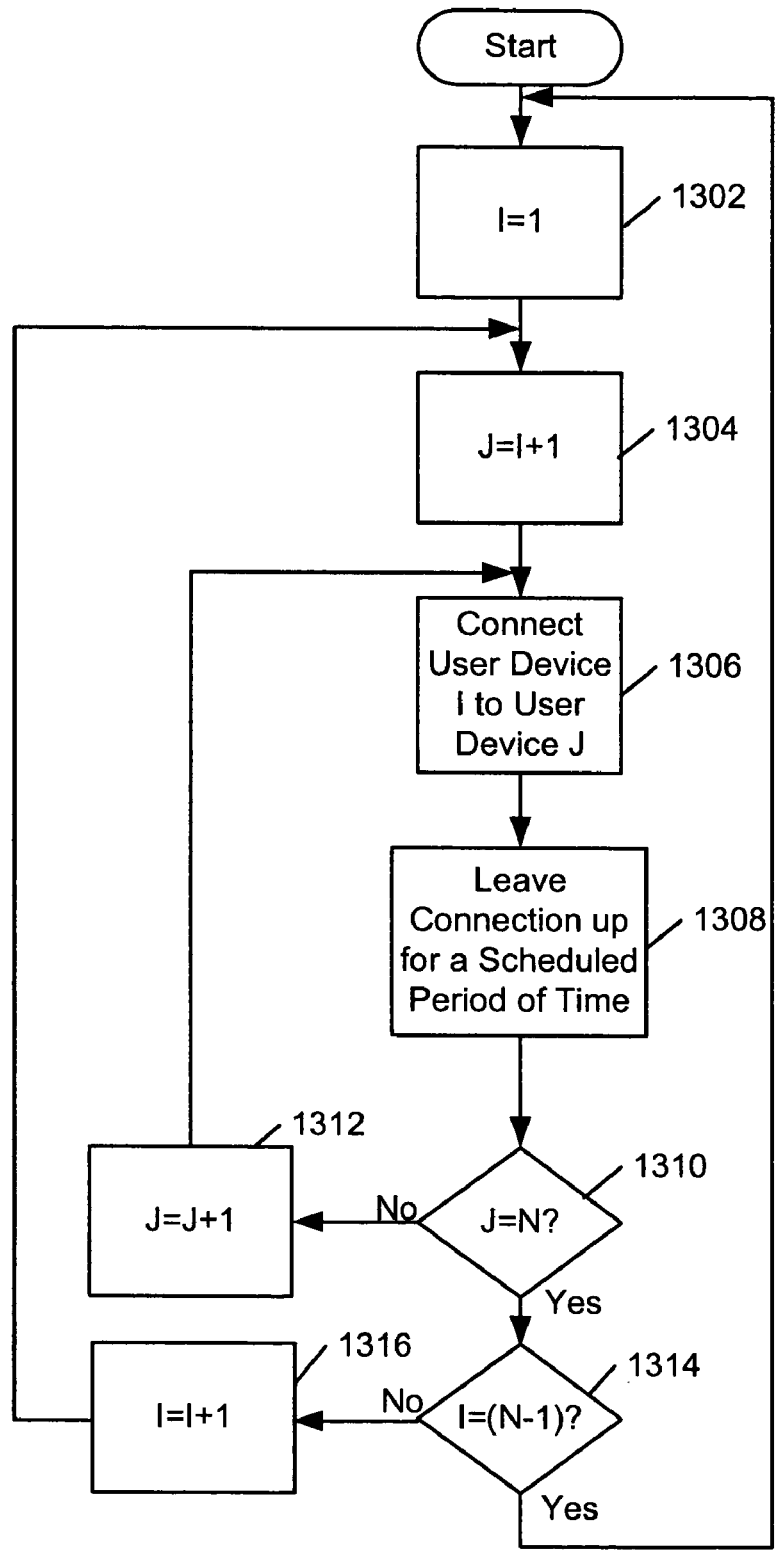
FIG. 13 is a flowchart that illustrates an exemplary process that may be performed in a QKD switch consistent with the principles of the invention.

FIG. 13 is a flowchart, corresponding to an implementation of act 1202 of FIG. 12, that illustrates an exemplary process performed in a switch consistent with the principles of the invention. The exemplary process illustrates a switch performing round-robin scheduling of user devices connected thereto.

At acts 1302 and 1304, the switch sets I to 1 and J to (I+1), respectively. At act 1306, the switch connects user device I to user device J. At act 1308, the switch leaves the connection in place for a period of time. The period of time may be included in a schedule, such as the exemplary schedule of FIG. 11, described above. The schedule may be stored in a database 1004. Alternatively, the switch may leave each connection in place for a predetermined time period, a random time period, a probabilistic time period, or other periods as may be desired. In such alternate implementations, connections may remain in place for a predetermined time period, a random time period, a probabilistic time period, or other periods as may be desired.

At act 1310, the switch determines whether J is equal to N, where N represents the last user device with which the switch will connect before connections to pairs of user devices are repeated. If J is not equal to N, then at act 1312, the switch increments J by 1 and performs act 1306 again to connect user device I with user device J.

If at act 1310, the switch determines that J is equal to N, then at act 1314 the switch determines whether I is equal to (N−1). If I is not equal to (N−1), then the switch increments I at act 1316 and, at act 1304, the switch increments J by 1. If at act 1314, the switch determines that I is equal to (N−1), then the switch performs act 1302 to initialize I to 1, followed by act 1304 to initialize J to (I+1).

In one implementation, the switch connects every user device on the switch to every other user device on the switch, according to a schedule, such that the user devices build up a body of shared secret key material with each other. The key material may be used to encrypt messages between the devices at a later time.

Figure 14B:
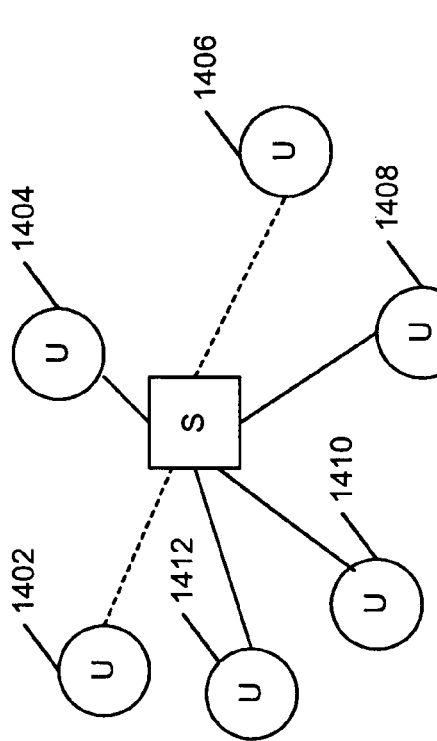
FIGS. 14A-14D illustrate an exemplary round-robin scheduling scheme that may be used by a QKD switch to establish connections with pairs of QKD endpoints.
Figure 14D:
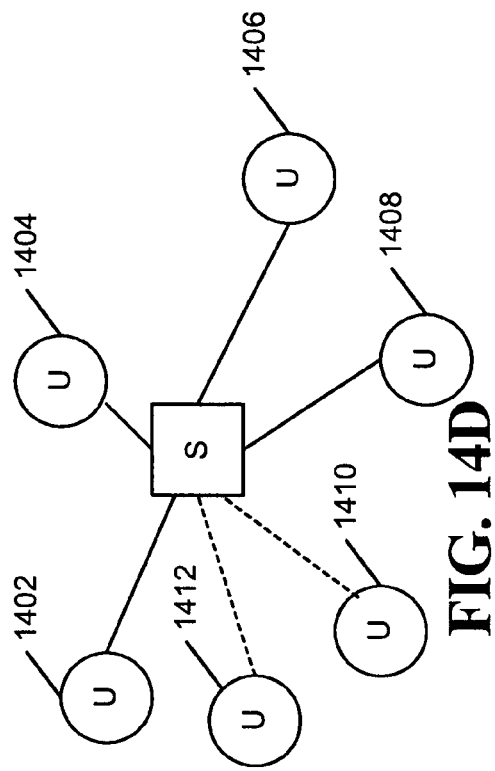
Figure 14A:
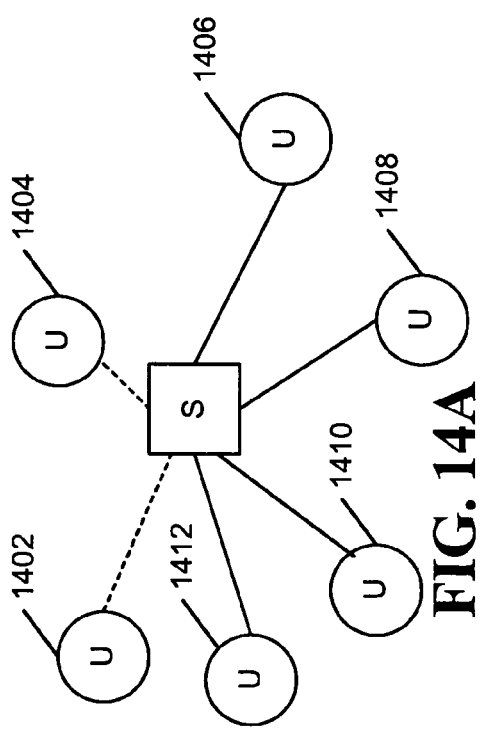
Figure 14C:
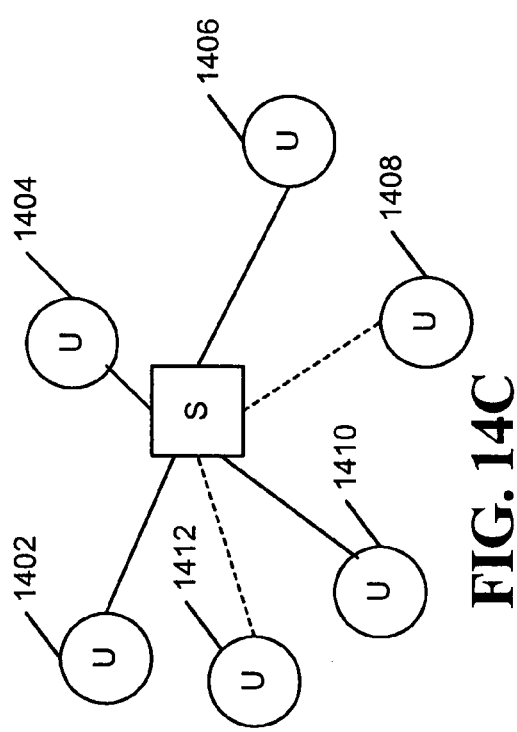

FIGS. 14A-14D illustrate a round-robin scheduling scheme in an exemplary implementation. Other scheduling schemes are also possible. In FIGS. 14A-14D the dashed lines represent the current switched connection. In FIG. 14A, the user device 1402 is connected to user device 1404 through the switch. In FIG. 14B, the switch switched the connection from user device 1402 to user device 1406. FIG. 14C shows the switched connection at a later point. In FIG. 14C, user device 1412 is connected to user device 1408. FIG. 14D shows user device 1412 connected to user device 1410 through the switch.

The switch may change the connection to a new pair of user devices according to a schedule accessible by the switch, such as the exemplary schedule of FIG. 11. The schedule may indicate a length of time that the connection is to remain established before switching to another connection. Thus, some connections may be connected through the switch for a longer period of time than others. There are no signaling or path setup protocols between the user devices and the switches. Thus, the user device detects when the switched connection changes and communications with a new user device occurs.

The user devices or QKD endpoints may be QKD transceiver endpoints, QKD transmitter endpoints or QKD receiver endpoints. That is, the user device may only be able to transmit on a QKD channel, receive on a QKD channel or transmit and receive on a QKD channel. Further, each of the user devices may be able to transmit and receive over a network, such as network 410, regardless of whether the user device is configured to be a QKD transmitter, a QKD receiver endpoint or a QKD transceiver endpoint.

Figure 15:
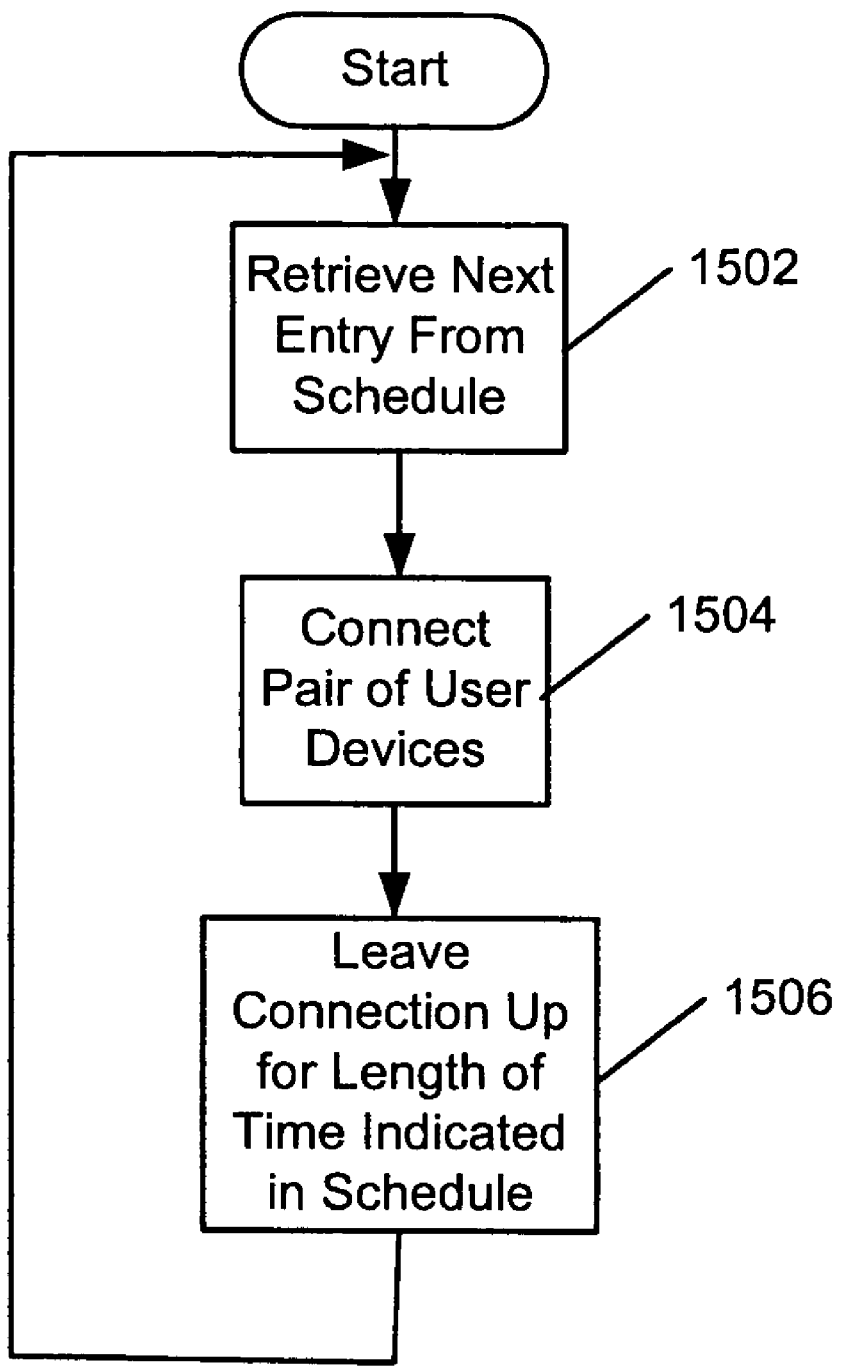
FIG. 15 is a flowchart that illustrates another exemplary process that may be performed in a QKD switch consistent with the principles of the invention.

FIG. 15 is another exemplary flowchart corresponding to act 1202 of FIG. 12 for illustrating processing in another implementation of a switch consistent with the principles of the invention. While the flowchart of FIG. 13 showed processing for a round-robin schedule, the flowchart of FIG. 15 is more general and can implement any type of schedule, such as, for example, the schedule of FIG. 11.

At act 1502, the switch retrieves a next entry from a schedule. The schedule may be in memory 810 or may be in a database in RAM, ROM, optical disk, magnetic media, or any other storage device.

At act 1504, the switch connects pairs of user devices as specified in the schedule entry and at act 1506, the switch leaves the connection up for a length of time indicated in the schedule entry. Acts 1502 through 1506 continue to be repeated.

Figure 16:
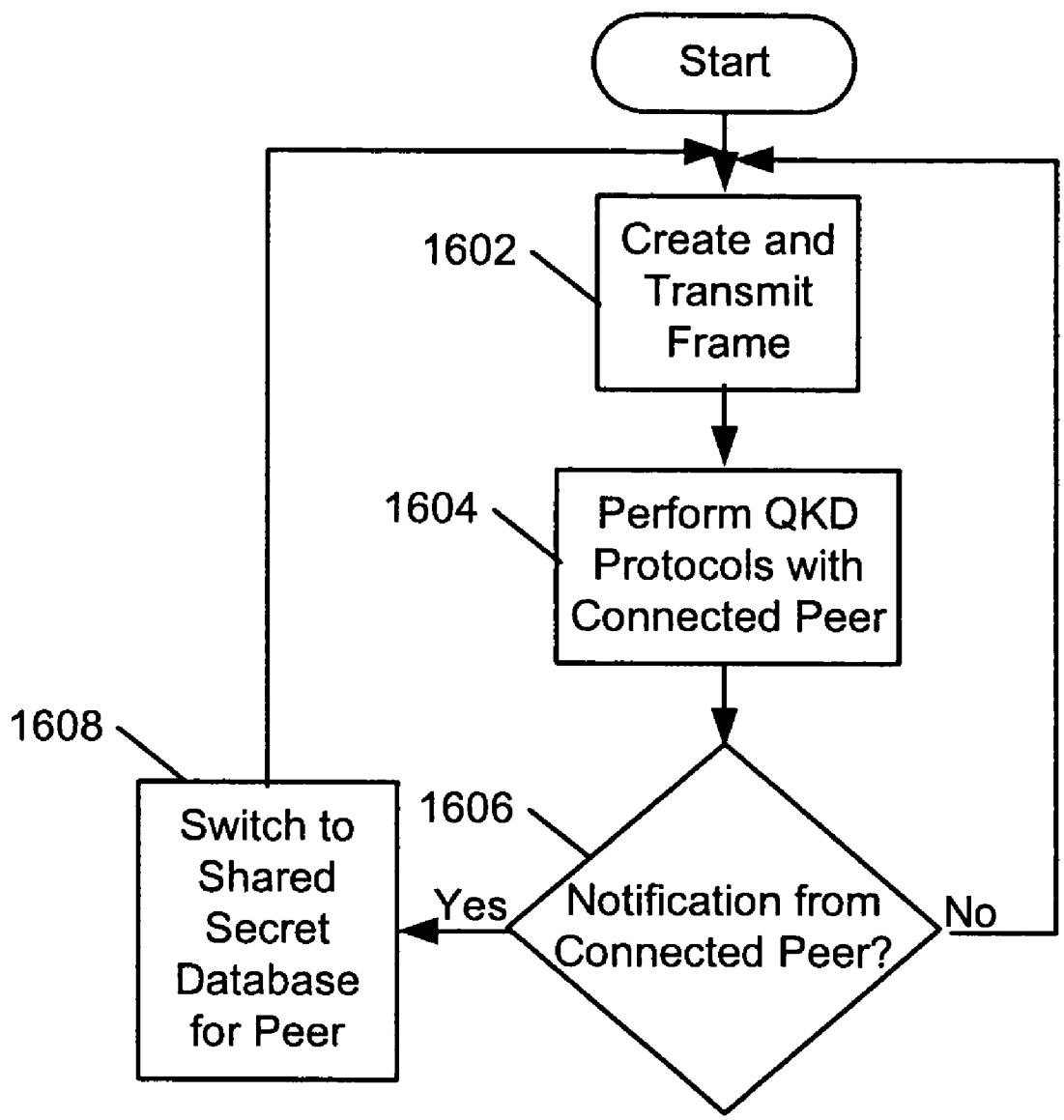
FIG. 16 is a flowchart that illustrates an exemplary process that may be performed in a QKD transmitter or transceiver endpoint.

FIG. 16 is a flowchart corresponding to act 1204 of FIG. 12 that explains processing in a user device that includes a QKD transmitter. At act 1602, the user device creates a frame and transmits the frame over a QKD channel. At act 1604, the user device exchanges QKD protocols with a connected peer user device.

At act 1606, the user device determines whether a notification was received from the peer user device over the public channel. This notification may include messages received over the public communications channel, e.g., via Internet datagrams, telephony signaling or data messages, ATM or Ethernet messaging, etc. Alternatively, the notification may include specialized indications, such as beams of light of appropriate frequencies sent along the quantum channel. These messages may indicate that a new session has been detected and indicate an identifier, such as an IP address for the new user device that has been connected. If no notification was received, then the user device repeats act 1602 to create and transmit another frame. If a notification was received then the user device switches the shared secret database to refer to the shared secret database for the peer user device identified by the notification. The user device may then return to act 1602 to create and transmit another frame.

Figure 17:
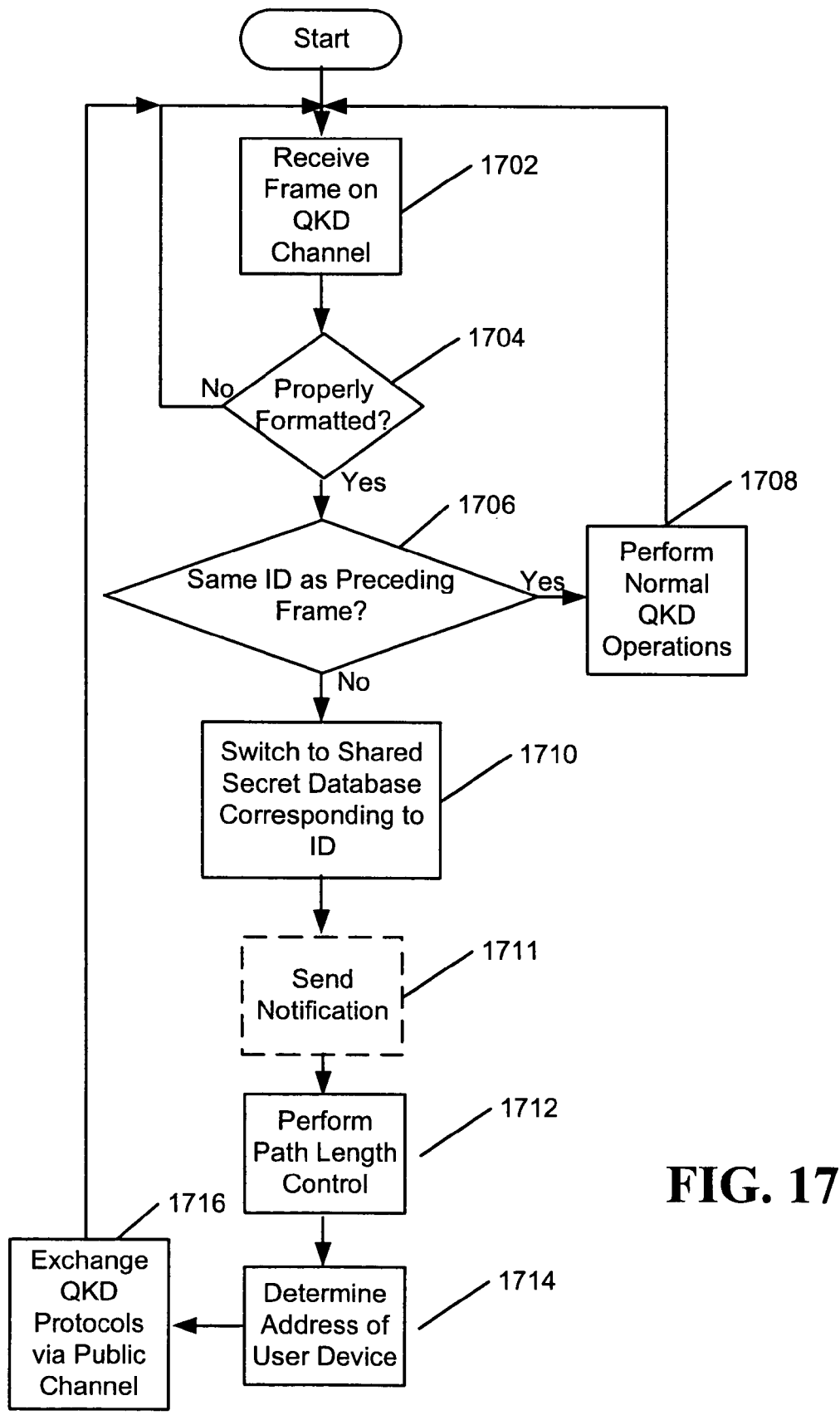
FIG. 17 is a flowchart that illustrates an exemplary process that may be performed in a QKD receiver or transceiver endpoint.

FIG. 17 is a flowchart which illustrates processing corresponding to act 1204 of FIG. 12 in an exemplary QKD endpoint or user device that includes a QKD receiver. At act 1702, the user device waits to receive a frame on a QKD channel. At act 1704, the user device may check the received frame to determine whether it is properly formatted. This may be done because the switch may change connections during reception of a frame causing the frame to be garbled.

If the frame is determined not to be properly formatted, then the switch will repeat act 1702 to cause the user device to wait to receive another frame on the QKD channel.

At act 1706, the user device determines whether the received frame has the same ID as the frame preceding the current frame. If so, then the connection has not yet changed and at act 1708, normal QKD operations may be performed. The user device then performs act 1702 to await reception of another frame on the QKD channel.

If at act 1706, the user device determines that the received frame has a different ID than the frame preceding the currently received frame, then the switch had changed the connection and the user device performs act 1710 to switch to the shared secret database corresponding to the user device referred to by the ID. In other words, the receiving user device will be prepared to refer to the shared secret database corresponding to the user device referred to by the ID.

At optional act 1711, the user device sends a notification to the peer user device, informing the peer of the new connection. The notification may be sent over the public communications channel, e.g., via Internet datagrams, telephony signaling or data messages, ATM or Ethernet messaging, etc. Alternatively, the notification may be sent via specialized indications, such as beams of light of appropriate frequencies sent along the quantum channel. These messages may indicate that a new session has been detected and indicate an identifier, such as an IP address for the new user device that has been connected At act 1712, the user device may perform a path length control algorithm to align the path length offsets in the Mach-Zehnder interferometers for the newly connected devices. One technique to perform path length control is described in U.S. patent application Ser. No. 10/716,078, entitled "SYSTEMS AND METHODS FOR IMPLEMENTING PATH LENGTH CONTROL FOR QUANTUM CRYPTOGRAPHIC SYSTEMS," filed on Nov. 18, 2003, and in U.S. Provisional Application No. 60/456,852, entitled "PATH LENGTH CONTROL FOR A QUANTUM CRYPTOGRAPHIC SYSTEM," filed Mar. 21, 2003. Alternatively, in so-called "plug and play" systems, the two devices may determine the distance between devices and necessary attenuation for single-photon operation as a means of calibrating the proper operation of a plug and play link between these two newly connected devices.

At act 1714, the user device determines an identity, for example, an IP address, of the peer user device. This may be performed by referring to information encoded into the header or trailer of a QKD frame. At act 1716, the user device exchanges QKD protocols via the public channel using the determined address to reach the peer user device over the public channel and then returns to act 1702.

Other Considerations

Figure 18:
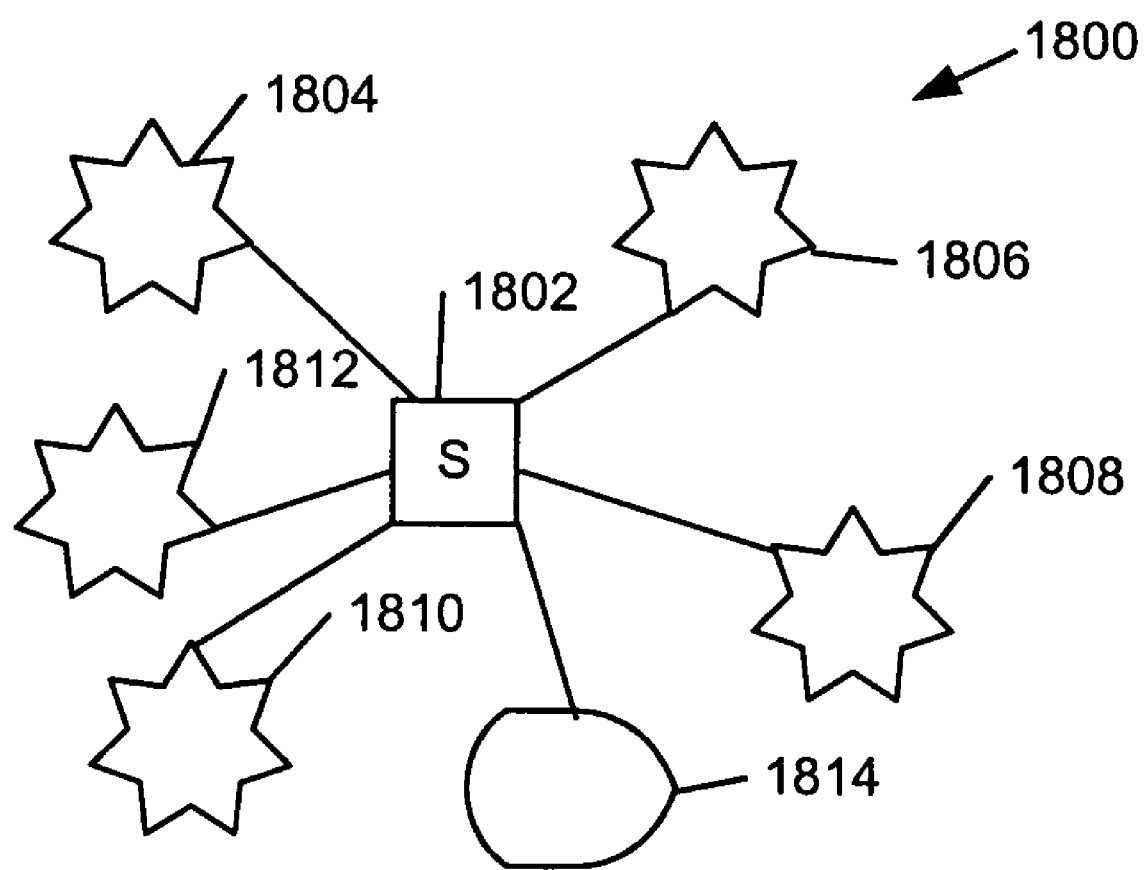
FIG. 18 illustrates an exemplary switch network having QKD endpoints that include a group of QKD receivers and a single QKD transmitter.

Transmitters may be substantially less expensive than receivers in a quantum cryptographic system based on fiber optics because receivers may require cooled detectors and more elaborate electronics than a transmitter. Therefore, it may be more desirable to organize a switch network as illustrated by exemplary switch network 1800, as shown in FIG. 18. User devices 1804, 1806, 1808, 1810 and 1812 are configured to have quantum transmitter hardware and no quantum receiver hardware. User device 1814 is configured to have quantum receiver hardware, but no quantum transmitter hardware. Thus, the possible pairs that can be connected through switch 1802 for the exchange of quantum cryptographic information are: (1804, 1814), (1806, 1814), (1808, 1814), (1810, 1814), and (1812, 1814). In the exemplary implementation, switch 1802 would connect every transmitter in turn to the single receiver of the network. Thus, every transmitter node has a set of secret bits shared with the receiver node, but not with any other node. Thus, transmitter devices 1804-1812 share secrets with 1814, but not with each other.

Alternatively, in some implementations receivers may be considerably cheaper than transmitters. It should also be understood that in "plug and play" systems, the Faraday mirror device may be considerably less expensive than the device that contains lasers and detectors. Further, user device 1814 may have only a transmitter, and the other devices may have only receivers, or in "plug and play" systems user device 1814 may include laser source and detectors while all other devices are based on Faraday mirrors or other forms of modulating retroreflectors.

CONCLUSION

Systems and methods consistent with the present invention, therefore, provide mechanisms for setting up a quantum key distribution path between pairs of user devices connected through a QKD switch in an untrusted network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible.

The switch has been described as if it can only connect a single pair of devices at any given time. This may be true for very simple switches; however, more advanced switches can connect multiple pairs of devices simultaneously, e.g., as in an N×N switch, or an N×M switch. Thus, implementations of the invention can be readily extended to include switches that connect multiple pairs of user devices simultaneously.

While series of acts have been described with regard to FIGS. 12-13 and 15-17, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method for distributing quantum cryptographic keys among a plurality of user devices through a switch connected to the plurality of user devices, the method comprising:
    establishing a connection between two of the user devices by the switch;
    establishing a Quantum Key Distribution session between the two user devices to facilitate sharing of secret key material between the two user devices; and
    repeating the establishing a connection and the establishing a Quantum Key Distribution session for different pairs of the user devices.

2. The method of claim 1, wherein:
    the repeating repeats for different ones of the pairs of the user devices before repeating for previously connected ones of the pairs of the user devices.

3. The method of claim 2, wherein the connections between each of the pairs of user devices has a same time duration.

4. The method of claim 1, wherein at least some of the connections between the pairs of the user devices are longer than at least some others of the connections.

5. The method of claim 1, wherein the repeating occurs more frequently for at least some of the pairs of the user devices.

6. The method of claim 1, wherein the establishing the connection occurs simultaneously among a plurality of the pairs of user devices.

7. The method of claim 1, wherein at least some of the user devices are quantum cryptographic transmitter nodes.

8. The method of claim 7, further comprising by at least one of the quantum transmitter nodes:
    creating and transmitting a frame;
    exchanging Quantum Key Distribution protocols with the connected user device;
    receiving a notification from a new connected one of the user devices and initiating or resuming a QKD session with that new device.

9. The method of claim 8, further comprising using a shared secret database for the new connected user device, the shared secret database including shared secret information regarding the two connected ones of the user devices.

10. The method of claim 7, wherein at least some of the user devices are quantum cryptographic receiver nodes.

11. The method of claim 7, wherein at least some of the user devices include a modulating retroreflector.

12. The method of claim 11, wherein the modulating retroreflector includes a Faraday mirror.

13. The method of claim 1, wherein at least some of the user devices are configured to perform a method comprising:
    receiving a frame;
    determining whether the frame is properly formatted;
    when the frame is properly formatted, performing:
        determining whether the frame is from a same one of the user devices as a preceding one of the frames and performing normal Quantum Key Distribution operations when the frame is determined to be from the same one of the user devices;
        when the frame is determined to be from a different one of the user devices than the preceding one of the frames, performing:
            determining an identity of the different one of the user devices; and
            exchanging Quantum Key Distribution protocols with the different one of the user devices via a public channel.

14. The method of claim 13, wherein the at least some of the user devices use a shared secret key database for the different one of the user devices, the shared secret database including shared secret information regarding a connection to the different one of the user devices.

15. The method of claim 13, wherein the at least some of the user devices send a notification to another user device when the frame is determined to be from a different one of the user devices than the preceding one of the frames.

16. The method of claim 13, wherein the at least some of the user devices are further configured to perform path length control.

17. The method of claim 1, wherein at least some of the user devices are configured to detect a change in the connection to another one of the user devices and, upon detecting the change, to start a new Quantum Key Distribution session.

18. The method of claim 1, wherein at least some of the user devices are configured to maintain a plurality of databases of shared secrets.

19. A system for distributing quantum cryptographic keys in an untrusted network, the system comprising:
    a switch; and
    a plurality of user devices, each of the user devices being configured to have a connection through the switch, wherein:
    the switch comprises:
        a connection establisher configured to establish a connection between pairs of the plurality of user devices according to a schedule; one of the user devices comprises:
        a Quantum Key Distribution session manager configured to establish a Quantum Key Distribution session with another one of the user devices via the established connection; and
        a secret sharer configured to derive shared secret information with the another one of the user devices.

20. The system of claim 19, wherein the secret sharer is configured to store the shared secret information in a database pertaining to the another one of the user devices.

21. The system of claim 20, wherein, in at least some of the user devices, the secret sharer is further configured to determine whether information is being received from a same one of the user devices, when the secret sharer determines that the information is being received from a different one of the user devices, the secret sharer is configured to switch to a shared secret database for the different one of the user devices and to store newly received shared secret information in the shared secret database for the different one of the user devices.

22. The system of claim 19, wherein the connection establisher is configured to establish connections having a same time duration between any pair of the user devices.

23. The system of claim 19, wherein the connection establisher is configured to establish connections between pairs of the user devices, where connections between some of the pairs are configured to be longer than the connections between others of the pairs.

24. The system of claim 19, wherein the connection establisher is configured to establish connections more frequently between some pairs of the user devices than between other pairs of the user devices.

25. The system of claim 19, wherein the schedule includes random or pseudo-random intervals for lengths of connections between the pairs of the user devices.

26. The system of claim 19, wherein the switch is configured to establish simultaneous connections between the pairs of the user devices.

27. The system of claim 19, wherein at least one of the user devices is configured to be a quantum cryptographic receiver and not a quantum cryptographic transmitter.

28. The system of claim 19, wherein at least one of the user devices is configured to be a quantum cryptographic transmitter and not a quantum cryptographic receiver.

29. The system of claim 19, wherein at least one of the user devices includes a modulating retroreflector for quantum cryptography.

30. The system of claim 19, wherein at least one of the connections is conveyed, at least partially, via freespace.

31. The system of claim 19, wherein at least one of the connections is conveyed, at least partially, via an optical fiber.

32. The system of claim 19, wherein at least one of the connections is conveyed, at least partially, via a photonic band-gap fiber.

33. A switch configured to establish a connection between a plurality of pairs of quantum cryptographic user devices, the switch comprising:
    a connection establisher configured to successively establish a connection between the pairs of the quantum cryptographic user devices according to a schedule.

34. The switch of claim 33, wherein the connection establisher is further configured to establish each of the connections with a same time duration.

35. The switch of claim 33, wherein the connection establisher is further configured to establish each of the connections such that some of the connections have a shorter time duration than others of the connections.

36. The switch of claim 33, wherein the connection establisher is further configured to establish connections to some of the pairs of the quantum cryptographic user devices more frequently than connections with other pairs of the quantum cryptographic user devices.

37. The switch of claim 33, wherein the connection establisher is further configured to establish connections between a plurality of pairs of the quantum cryptographic user devices simultaneously.

38. The switch of claim 33, wherein the switch includes a mirror for optical switching.

39. The switch of claim 33, wherein the switch includes Micro Electronic Mechanical System (MEMS) mirror for optical switching.

40. The switch of claim 33, wherein the switch is configured to employ movement of a fiber for optical switching.

41. The switch of claim 33, wherein the switch is configured to employ a bubble for optical switching.

42. A user device configured to communicate with a second user device via a Quantum Key Distribution switch configured to switch connections among a plurality of user devices, including the user device and the second user device, according to a schedule, the user device comprising:
    a QKD session manager configured to establish a QKD session with the second user device via the QKD switch; and
    a secret sharer configured to exchange secret information with the second user device over the QKD session passing through the QKD switch.

43. The user device of claim 42, wherein the secret sharer is configured to store the shared secret information in a database pertaining to the connection with the second user device.

44. The user device of claim 43, wherein the secret sharer is further configured to switch to a shared secret database for the another user device when the user device determines that the QKD switch switched the connection, the secret sharer being further configured to store the shared secret information in a database pertaining to the connection with the another user device.

45. The user device of claim 44, wherein the user device is further configured to determine an identity of the another user device and to exchange QKD protocols with the another user device over a public channel.

46. A system for distributing quantum cryptographic keys in an untrusted network, the system comprising:
    means for establishing a connection between pairs of user devices according to a schedule;
    means for establishing a Quantum Key Distribution session between a pair of the user devices via the established connection; and
    means for agreeing upon shared secret information derived from the Quantum Key Distribution session.

47. A computer-readable memory device having stored thereon instructions for at least one processor to perform a method, the method comprising:
    successively establishing a connection between pairs of a plurality of quantum cryptographic user devices according to a schedule.

48. The computer-readable memory device of claim 47, wherein the method further comprises establishing each of the connections with a same time duration.

49. The computer-readable memory device of claim 47, wherein the establishing further establishes each of the connections such that at least one of the connections has a different time duration than others of the connections.

50. The computer-readable memory device of claim 47, wherein the establishing further establishes connections to some of the pairs of the quantum cryptographic user devices less frequently than connections with other pairs of the user devices.

51. The computer-readable memory device of claim 47, wherein the establishing further establishes connections between a plurality of pairs of the quantum cryptographic user devices simultaneously.

52. A computer-readable memory device having stored thereon instructions for at least one processor to perform a method, the method comprising:

establishing a Quantum Key Distribution session between a first user device and a second user device via a Quantum Key Distribution switch, which is configured to switch connections among a plurality of user devices, including the first and the second user devices, according to a schedule; and agreeing on secret information derived from the Quantum Key Distribution session between the first user device and the second user device.

53. The computer-readable memory device of claim 52, wherein the method further comprises storing, in a database associated with the first user device, the shared secret information pertaining to the connection with the second user device.

54. The computer-readable memory device of claim 53, the method further comprising:

determining, in the first user device, whether the Quantum Key Distribution switch switched the connection to a third user device; and switching to a shared secret database for the third user device when the first user device determines that the Quantum Key Distribution switch switched the connection to the third user device; and storing the shared secret information in the shared secret database pertaining to the connection with the third user device.

\* \* \* \* \*